(12) United States Patent
Mayer et al.

(10) Patent No.: US 11,920,721 B2
(45) Date of Patent: Mar. 5, 2024

(54) APPARATUS AND METHOD FOR IN-SITU FABRICATION OF BI-LAYER COMPOSITE PIPE BY DEFORMATION MANUFACTURE OF COMPRESSION-FIT, SHAPE MEMORY POLYMER PIPE (SMPP) MECHANICALLY UNITED WITH HOST PIPE

(71) Applicants: Andrew J. Mayer, Jacksonville, FL (US); Harvey E. Svetlik, Pipe Creek, TX (US)

(72) Inventors: Andrew J. Mayer, Jacksonville, FL (US); Harvey E. Svetlik, Pipe Creek, TX (US)

( * ) Notice: Subject to any disclaimer, the term of this patent is extended or adjusted under 35 U.S.C. 154(b) by 794 days.

(21) Appl. No.: 16/793,506

(22) Filed: Feb. 18, 2020

(65) Prior Publication Data

US 2021/0048134 A1  Feb. 18, 2021

Related U.S. Application Data

(60) Provisional application No. 62/885,887, filed on Aug. 13, 2019.

(51) Int. Cl.
| | |
|---|---|
| *B29C 63/42* | (2006.01) |
| *B29C 63/46* | (2006.01) |
| *B32B 1/08* | (2006.01) |
| *B32B 27/32* | (2006.01) |
| *F16L 55/165* | (2006.01) |

(52) U.S. Cl.
CPC .......... *F16L 55/1653* (2013.01); *B29C 63/42* (2013.01); *B29C 63/46* (2013.01); *B32B 1/08* (2013.01); *B32B 27/32* (2013.01); *F16L 55/1652* (2013.01); *B32B 2250/02* (2013.01)

(58) Field of Classification Search
CPC ........ B32B 1/08; B29C 63/42; F16L 55/1653; F16L 55/1652
See application file for complete search history.

(56) References Cited

U.S. PATENT DOCUMENTS

| | | |
|---|---|---|
| 2,110,965 A | 3/1938 | Singer |
| 2,198,149 A | 4/1940 | Bangert |
| (Continued) | | |

OTHER PUBLICATIONS

M. Farshad, "Determination of the Long-Term Hydrostatic Strength of Multilayer Pipes", Article, Polymer Testing 24 (2005) pp. 1041-1048, copyright 2005, Elsevier Ltd.

(Continued)

*Primary Examiner* — Alison L Hindenlang
*Assistant Examiner* — Debjani Roy
(74) *Attorney, Agent, or Firm* — Whitaker Chalk Swindle & Schwartz, PLLC; Charles D. Gunter, Jr.

(57) ABSTRACT

A method and apparatus for lining a host pipe with a shape memory polymer liner in which the liner is fed through a manufacturing assembly including a pipe tensioner, followed by a deformation tool, prior to entering the host pipe, the liner being pulled through the host pipe from a leading end, the component parts of the manufacturing assembly acting to temporarily reduce the liner outside diameter during the pulling operation, while allowing the liner to revert to at least the internal diameter of the host pipe upon removal of the pulling load. The liner being used is a shape memory polymer which exhibits the ability to return from a deformed shape to an original shape induced by an external stimulus.

13 Claims, 12 Drawing Sheets

(56) References Cited

U.S. PATENT DOCUMENTS

| | | | |
|---|---|---|---|
| 2,886,170 A | 5/1959 | Kerr | |
| 3,050,786 A | 8/1962 | St. John et al. | |
| 3,462,825 A | 8/1969 | Pope et al. | |
| 4,777,984 A * | 10/1988 | Storah | B29C 49/26 138/98 |
| 5,048,174 A * | 9/1991 | McGuire | B29C 53/086 29/402.09 |
| 5,167,056 A | 12/1992 | McGuire | |
| 5,214,835 A | 6/1993 | McGuire | |
| 5,839,475 A | 11/1998 | Maine et al. | |
| 5,992,467 A | 11/1999 | Roach | |
| 2004/0103948 A1 * | 6/2004 | Scheelen | B32B 1/08 138/145 |
| 2006/0151913 A1 * | 7/2006 | Graham | F16L 55/1651 264/269 |
| 2006/0252983 A1 * | 11/2006 | Lembo | A61F 5/0053 606/151 |
| 2013/0087236 A1 * | 4/2013 | Koch | F16L 55/1658 138/97 |
| 2014/0314492 A1 * | 10/2014 | Blasczyk | B29C 63/46 405/184.2 |
| 2018/0066636 A1 * | 3/2018 | Khoshkava | C22F 1/006 |
| 2020/0071509 A1 * | 3/2020 | Borse | C08F 210/16 |

OTHER PUBLICATIONS

Ayub A. Miraje, et al., "Optimum Thickness of Three-Layer Shrink Fitted Compound Cylinder for Uniform Stress Distribution", Article, vol. 3, issue 2, pp. 591-605, International Journal of Advances in Engineering & Technology, May 2012, ISSN: 2231-1963.

* cited by examiner

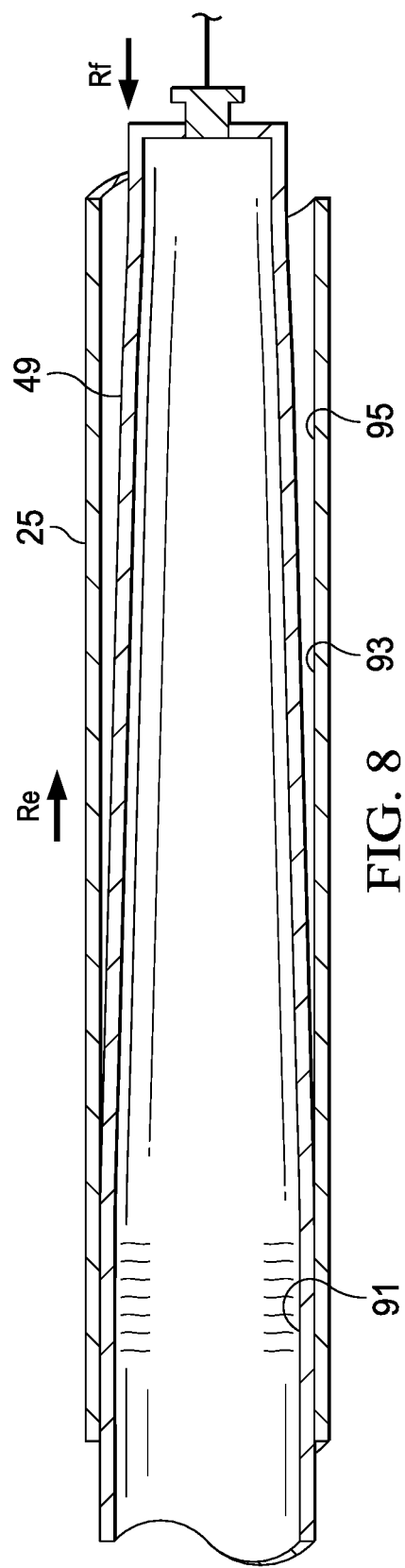

APPARATUS AND METHOD FOR IN-SITU FABRICATION OF BI-LAYER COMPOSITE PIPE BY DEFORMATION MANUFACTURE OF COMPRESSION-FIT, SHAPE MEMORY POLYMER PIPE (SMPP) MECHANICALLY UNITED WITH HOST PIPE

BACKGROUND OF THE INVENTION

1. Field of the Invention

The present invention relates generally to devices and methods for restoration and improvement of a degraded host pipe by in-situ formation of a bi-layer composite pipe formed by uniting the new, field re-manufactured, pressure-rated, compression-fit, Shape Memory Polymer Pipe, with the remnant strength of the host pipe, to integrally contain the flow of liquid chemicals, oil, gas, water, slurry, sewer, and any other fluid.

2. Description of the Prior Art

It is very common for underground pipelines, such as those utilized for the transport of fluids or gases or other substances, to deteriorate over time, becoming damaged, worn or corroded from use. At the present time, one of the primary methods and systems utilized to restore leak integrity of existing pipeline systems is to line (as a material serving as a barrier, gasket, or seal) an existing pipeline with a snug-fit or adherent polymer liner.

Examples of such technologies are thick polymer coatings (paints), loose slip-lining, folded U-liner, close-fit snug-liners, and cast-in-place epoxy-fiber liners. Another example is a process referred to in the industry as "swage-lining". The "swage-lining" process uses a liner having an outside diameter that is slightly larger than the inside diameter of the pipe being lined, referred to as a host pipe. Because of the difference in diameter between the liner and the host pipe, the liner is pulled and grossly stretched through a single abrupt circular die to reduce the plastic pipe's diameter before it enters the host pipe. Deformation processes for die-drawing of circular metal pipes and metal wire are well known going back over 100 years. There are many swaging processes applicable to small diameter (less than 14-inch diameter) pipes. Virtually all swaging processes involve working the tubular near or above its material tensile yield point, in its plasticity zone, from which the new size and shape is not necessarily recoverable to its previous round size and shape.

In a typical "swage-lining" operation, the polymeric swage-liner is forceably pulled and elongated through the single die after sections of the liner are butt fused together to form a continuous string. The die helps temporarily reduce the diameter of the sealing liner while the liner is axially stretched, as in a "Chinese-Finger". This axial elongation and diameter reduction allows the liner to be pulled through the outer existing host pipe. The die used in the prior art systems generally has an entry, an angular throat and an exit, with the entry decreasing in diameter towards the throat and increasing in diameter away from the throat. Thus, the liner has a maximum diameter before the die, a minimum diameter in the die, and an intermediate diameter after the die.

In "swage-lining" operations, the tension imposed on the liner by the die is generally maintained by a pulling element until the liner is correctly-positioned within the host pipeline. The liner may be pulled through the die and the existing pipe system by a winch connected to a pipe pull-head. Because of the forces involved, it is not uncommon for the forces exerted on the die and winch and pulling head to be very large. Also, some liner material retains a "memory" of its original shape and size, and can begin to return to some of its original shape and diameter when the pulling force is diminished or disconnected, depending upon load duration and percent elongation. After the pulling force is disconnected, the liner relaxes and conforms snuggly against the inside of the existing host pipeline.

Although host pipe seal-lining processes of this general type have been in use for many years, the known lining processes also have numerous deficiencies in terms of costs, efficiency, length of achievable lining run, etc., as will be described more fully hereafter. Another deficiency is that the liner is considered as a simple lining or seal-coating, merely sealing leak-points, and does not contribute or improve the pressure capacity of the host pipeline. A further deficiency is that fully reducing the liner in a swage die in a single step often results in extreme point friction on the liner in addition to over-strain on the liner wall and its segment joints. This strain and friction often results in mechanical failure of the liner both pre- and post-insertion. Additionally, larger percent deformation diameter reduction dies "work" the plastic tube too quickly, faster than the polymer can absorb the energy input, damaging it, thus affecting the molecular structure and inter-molecular order, such that the degree of diameter recovery is substantially less than desired, sometimes leaving the liner slightly loose, and inefficient in its sealing function.

There is also a more fundamental problem inherent in the "swage-lining" process in use today. A reduced diameter liner experiences high levels of longitudinal tension resulting in longitudinal stretching. It has been observed that even a relatively short length of liner may stretch by five to ten feet when exposed to the tensions involved in uncontrolled liner reduction systems. When the stretched liner is finally in place and the tension is released, the liner will shorten in length and begin to revert to most of its shape and size prior to the reduction. Over the course of about a 24 hour period, a liner will typically revert and recover to about 80-90% of its initial size and shape, with corresponding length reduction.

In some cases, the elongated "pull-head" terminal end of the liner can unintentionally shrink into the existing host pipeline, resulting in an incomplete lining situation. This post-release creep can present other problems. After the tension in the system is released, it is not uncommon for the inserted liner to further creep and axially shrink more than expected. Generally, this gradual axial creep continues for a significant time period after the insertion and release of the liner. This continued moving and pulling of the inserted liner is problematic because it results in a liner with less than perfect contact, that is susceptible to potential leaks and can pull the movable liner out of attached fittings.

This type of longitudinal reversion can lead to a multitude of problems in the field. The liner's axial creep recovery may continue for a considerable time, including after the project is completed and the liner is no longer monitored. When a project is completed, however, any surplus liner extending beyond the host pipe is generally trimmed. If the liner continues to axially revert or shrink, the cut end of the liner is at risk of retreating into the host pipe, defeating the purpose of threading a liner in the first place, and rendering it very difficult and expensive to retrieve or augment the liner with additional lengths of liner. Further, fittings are often attached to the end of the liner. Even if the fittings are installed before such retreat, as the liner continues to creep, these fittings may be exposed to excessive forces jeopardizing the integrity of the terminal joint.

Many of the above described problems are due to the inherent nature of the polymeric material used for the liner. One new class of plastic pipe materials which offers a number of advantages as a non-corroding internal pipe for manufacturing in-situ bi-layer composite pipelines, of the type disclosed here-in, is the aptly designated "shape memory polymer" (SMP). These SMP materials, as will be described more fully hereafter, have the advantageous property of being able to return from a deformed shape to an original shape, for example from a reduced outer diameter to a near original outer diameter, with minimal axial elongation or contraction, while adding strength to the host pipe. Additionally, under the technology disclosed here-in, pipe diameters larger than 14-inch up to approximately 78-inch diameter can be processed, which was not previously possible.

It is, therefore, an object of the present invention to eliminate many of the problems associated with the prior art of seal-lining processes and materials, particularly with the "swage-lining" process, and to move beyond "lining" by simultaneously reinforcing the host pipe to improve its in-situ working pressure rating as a bi-layer composite pipe structure. By processing the new SMP materials using innovative and improved devices and methods, a restored and augmented composite pipeline is created in-situ, specifically in pipe diameters of 14-inch diameter and larger.

SUMMARY OF THE INVENTION

As has been explained, there are various shortcomings associated with the presently used "swage-lining" method for lining a host pipe with a SMP tube, many of which relate to the nature of the polymeric material itself. These shortcomings present a number of practical problems in the manufacturing process. For example, when pulling on the nose of the SMP tube, after it has been pulled for a longer time at a given stress, it tends to neck down due to the time interval because it is being stretched. However, the tail end (e.g., last 10 feet in) may have been reduced down but does not have any stored progressive stress. The tube at this point might be visualized, for purposes of explanation, as a very long tapered cone, ever so slightly tapered. Once an extra amount of the tube has been pulled through the host pipe and it is allowed to begin retracting by releasing slowly on the tension in the front nose, the back end portion, which has been reduced down, is at a slightly larger diameter than the nose, so the tail end tends to enter the host pipe and then lock up. As the load on the pulling nose is released, the tail end starts to back fill like a Chinese finger puzzle, and re-expands from the tail end all the way up to the exit end. To avoid these undesirable consequences, it would be desirable to provide more control over the process in order to provide full compression and support for the liner during the process.

Another way of thinking about the prior art process is that the process pulls on the tubular liner with brute force stretching. The ideal situation would be to evenly radially compress, then pull the tube into the host pipe, thereafter letting the liner radially recover. This is impossible to do, in a perfect sense, because there is always some element of elongation involved. The prior art had excessive amounts of axial elongation. One of the primary aims of the system of the invention is to minimize the axial elongation to a bare minimum, thereby avoiding exaggerated axial contraction during diameter recovery.

The method of the present invention uses a pipe tensioning mechanism and a deformation tool mechanism (reduction tool box) at the entrance end of the host pipe as a part of the manufacturing process. The pipe tensioning mechanism picks up and pulls the SMP tube, feeding it into the reduction tool box, making the initial drag-load independent of the friction through the reduction tool box and the drag load of passing through the host pipe. The system also provides a tension differential so that the pipe gets worked at a uniform velocity, i.e., so that the same amount of work is put into every foot of the pipe, thereby achieving a uniform degree of deformation. This approach eliminates problems associated with the prior art where the tube is released and allowed to recover, with portions of the tubular that were worked more quickly having less energy and deformation strain stored in them, so that they will recover quickly and trap air in between enlarged diameter un-even recovery sections. Annular void spaces of this type cause a number of problems and result in less recovery by the tubular. The system of the invention provides more exact working of the SMP with the result being a more uniform product without hollow annular spaces between the SMP tube outside diameter and the Host pipe inside diameter.

In one preferred form, a method is shown for installing a compression-fit, shape memory polymer pipe into a host pipe overcoming the deficiencies of the prior art noted above. A pre-form polymer pipe is first provided comprised of a shape memory polymer tube which exhibits the ability to return from a deformed shape to an original shape induced by an external stimulus, such as temperature of the removal of axial tension. The shape memory polymer pipe is fed to a pipe tensioner mechanism which pulls a tail end of the polymer pipe rearward while simultaneously pushing the SMP pipe forward to a deformation tool mechanism. The SMP pipe passes from the deformation tool mechanism (tool box) into the host pipe. A forward end of the SMP pipe is pulled through the host pipe by a pulling mechanism, such as a suitable winch mechanism or hydraulically powered linkages. The SMP pipe meantime is held in axial tension sufficient to inhibit diameter memory recovery of the shape memory polymer and to overcome drag friction of the SMP pipe at axial tension loads low enough to minimize axial creep elongation of the SMP pipe undergoing the process of insertion. Once the SMP pipe is fully inserted within the host pipe, pulling is discontinued, thereby allowing the shape memory polymer to recover memory, return to its near original outer diameter, and be fully seated within, and become united with, the host pipe.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 8 is a simplified, side cross sectional view illustrating the release of installation force in the SMP tubular inside the host pipe.

DETAILED DESCRIPTION OF THE INVENTION

Figure 1:
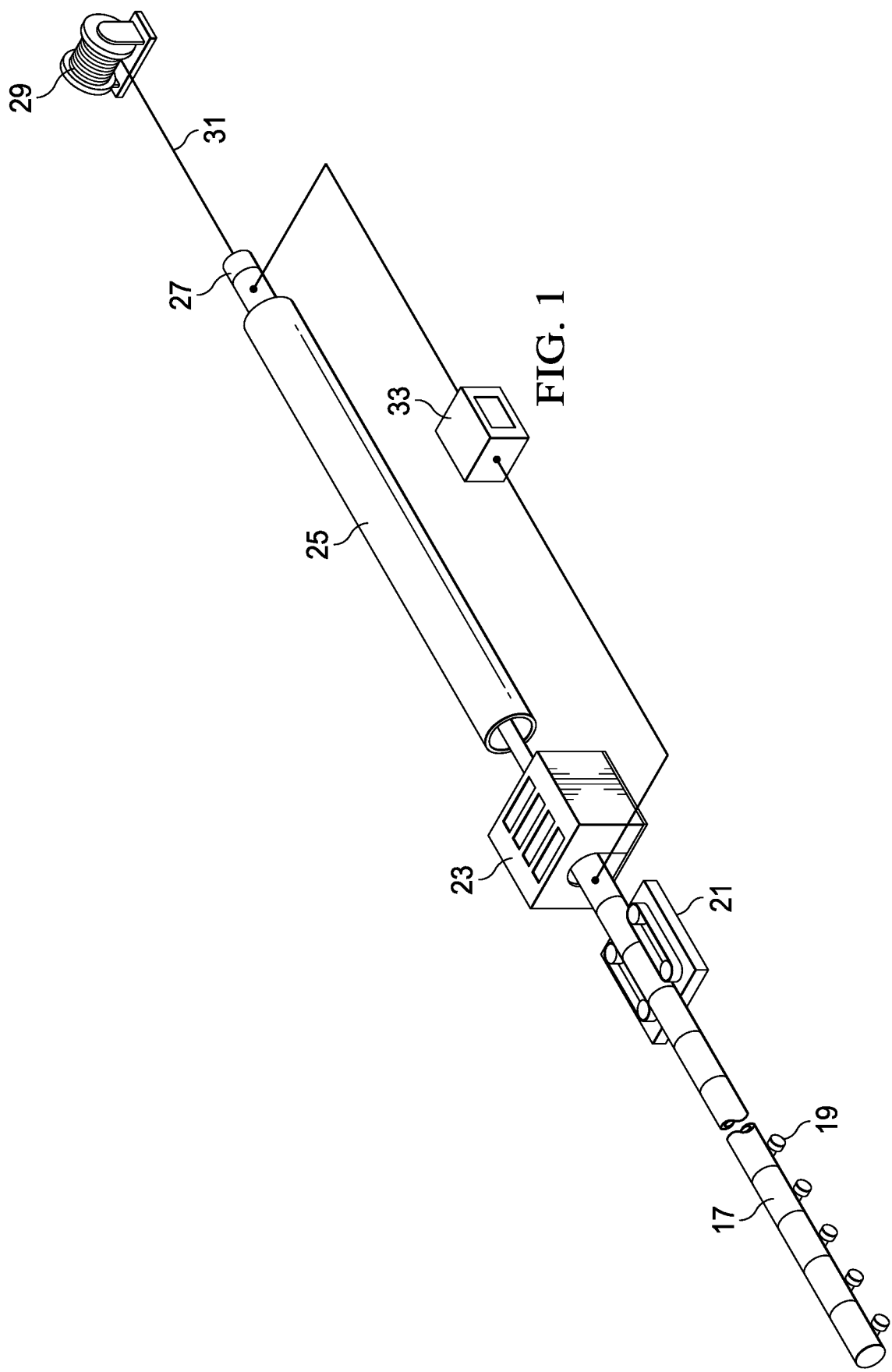
FIG. 1 is a simplified, partly schematic view of a process for lining a host pipe using the apparatus and method of the present invention.

The invention described herein and the various features and advantageous details thereof are explained more fully with reference to the non-limiting examples which are illustrated in the accompanying drawings and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

The process of the present invention provides for the deformation manufacture and installation of large diameter shape memory polymer (SMP) thermoplastic pipe which is compress-fit into and within a host pipe, achieving characteristics of a multi-layer and multi-material pressure capable conduit. The result is the improvement and/or restoration of the host pipe's leak integrity, and/or pressure capacity, and/or flow rate. In one preferred form, the invention allows for the deformation manufacture and installation of large diameter (e.g., greater than 14-inch diameter pipe) into short host pipes, and/or, very-long in-situ subterranean host pipelines.

The process of the invention uses thermoplastic tubulars (thermoplastic pipe liners) which are made from materials exhibiting shape-memory polymer (SMP) characteristics. The term "Shape Memory Polymers (SMP's)" as used herein will be taken to mean thermoplastic materials which exhibit the ability to return from a deformed state (temporary shape) to their original (permanent) shape induced by an external stimulus (trigger) such as temperature change or release of deformation stress.

The selection of the particular polymer for the tubular liner is an important factor in the overall success of the liner installation. The preferred polymeric materials for purposes of the present invention are shape memory polymers (SMP's) in tubular form, which exhibit the characteristic of being radially deformable to a smaller diameter, and the subsequently releasing said stored deformation energy, and recovering towards the original OD.

The preferred class of polymeric materials are Shape Memory Polymers (SMP) of the classes: typically semi-crystalline macro-molecular structure material. Examples of such SMP's are polyethylene, nylon, acetal, polybutyleneterathalate (PBT), polycarbonate (PC), etc. Generally, the most economically attractive SMP is "pipe-grade polyethylene", as characterized by ASTM D2837 and ISO 9080. The preferred, most favored SMP pipe grade polyethylene resins are PE4710 (ASTM D3350) and PE100 (ISO). The most preferred SMP is bi-modal, tri-modal, and/or multi-nodal molecular weight distribution PE4710's and PE100's. These SMP's exhibit the property of enhanced viscoelasticity, which significantly contributes to the polymeric 'memory' demonstrated by cylindrical recovery from radial compressive strain deformation.

The enhanced short-term radial recovery characteristic of PE4710 and PE100 materials is due to its enhanced molecular architecture which involves greater molecular entanglements within and throughout the amorphous portion of the semi-crystalline polymer. Viscoelasticity is a property of SMP's which provide for a simultaneous elastic and viscous response to deformation. Mechanistically, viscoelasticity is a physical displacement and slight rearrangement of chain molecules. As stress (load) is applied to the SMP viscoelastic polymer, some parts of the long chain molecules change position and re-arrange in proportion to the applied strain. The polymer remains a solid material even when those parts of the long chain molecules are rearranging, pushed about by the applied stress. As this movement occurs, it creates a spring-like back-stress in the material as the molecules are distorted. When the molecular back-stress resistance to deformation re-arrangement equals the magnitude of applied stress, the material no longer creeps. When the original distortional load is removed, the accumulated molecular straightening or bending wants to revert and recover back to its original un-distorted configuration. The stretched or compressed long chain molecule can deform in the direction of the applied stress, and upon removal of stress, the molecule is driven by its atoms to re-configure to their original conformation.

On a macro-scale, the polymeric structure can be observed to return to its original form. The 'slow' return to original shape is a creep process (prefix: visco-), and its recovery to full original shape is elastic (suffix: elastic). The visco-elastic "memory" is a viscoelastic molecular process within the SMP. Where-as elasticity is usually the result of molecular bond stretching along crystallographic planes in an ordered solid, viscoelasticity is the result of diffusion movement of atoms and molecules or segments of molecules inside an amorphous material or the amorphous region of a semi-crystalline material. In this way, pre-form SMP tubulars are in-situ manufactured by the described proprietary process into smaller diameter cylinders, which later return towards their original dimeter, primarily by radial strain recovery.

The degree of visco-elasticity is influenced by the temperature of the SMP (velocity of molecular motion), the speed at which the polymer is deformed, the percentage to which the polymer is deformed, as well as polymer structural variables such as percent crystallinity, molecular entanglement, and molecular mass (weight average molecular weight at a molecular distribution curve). By influencing the material temperature, the percentages of progressive deformation, and the speed of deformation, for a specific polymer with its own crystallinity, internal entanglement, and molecular mass, it is possible to optimize the process for diameter recovery to develop the desired compression-fit between the SMP pipe OD, and the host pipe ID. The result is a final dual layer pipeline with enhanced, united, structural and/or pressure performance.

The thermoplastic tubulars used in the practice of the invention can include SMP's in solid-wall tubular form in large diameters (e.g., greater than about 14-inch to 108-inch diameters) with thick walls (greater than about 0.625" thick, to 6-inch thick). The size, massive weights, and forces involved in manipulating large diameter pipes at deeper burial depths is vastly different from small diameter pipes at shallow depths, necessitating significantly different equipment and processes.

Figure 2:
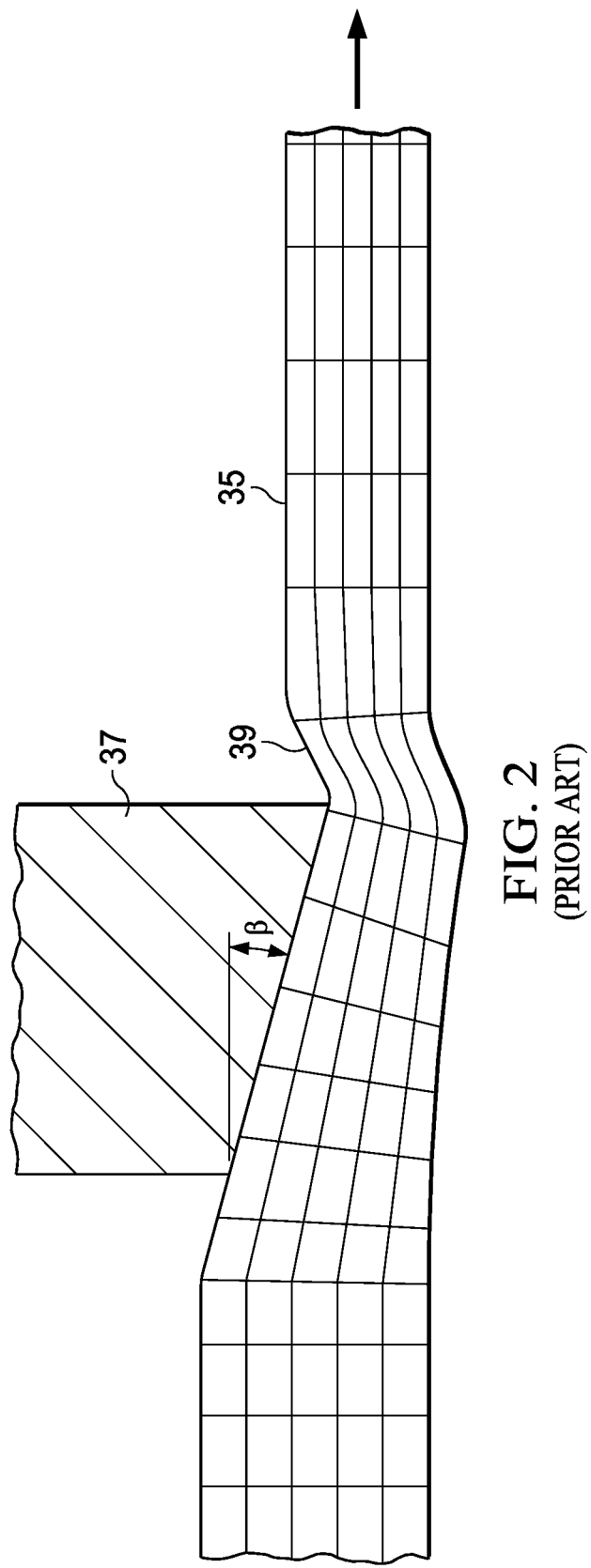
FIG. 2 is a partly schematic, quarter sectional view of a prior art swage lining process which resulted in high axial elongation and measurable wall thinning of the liner.
Figure 11:
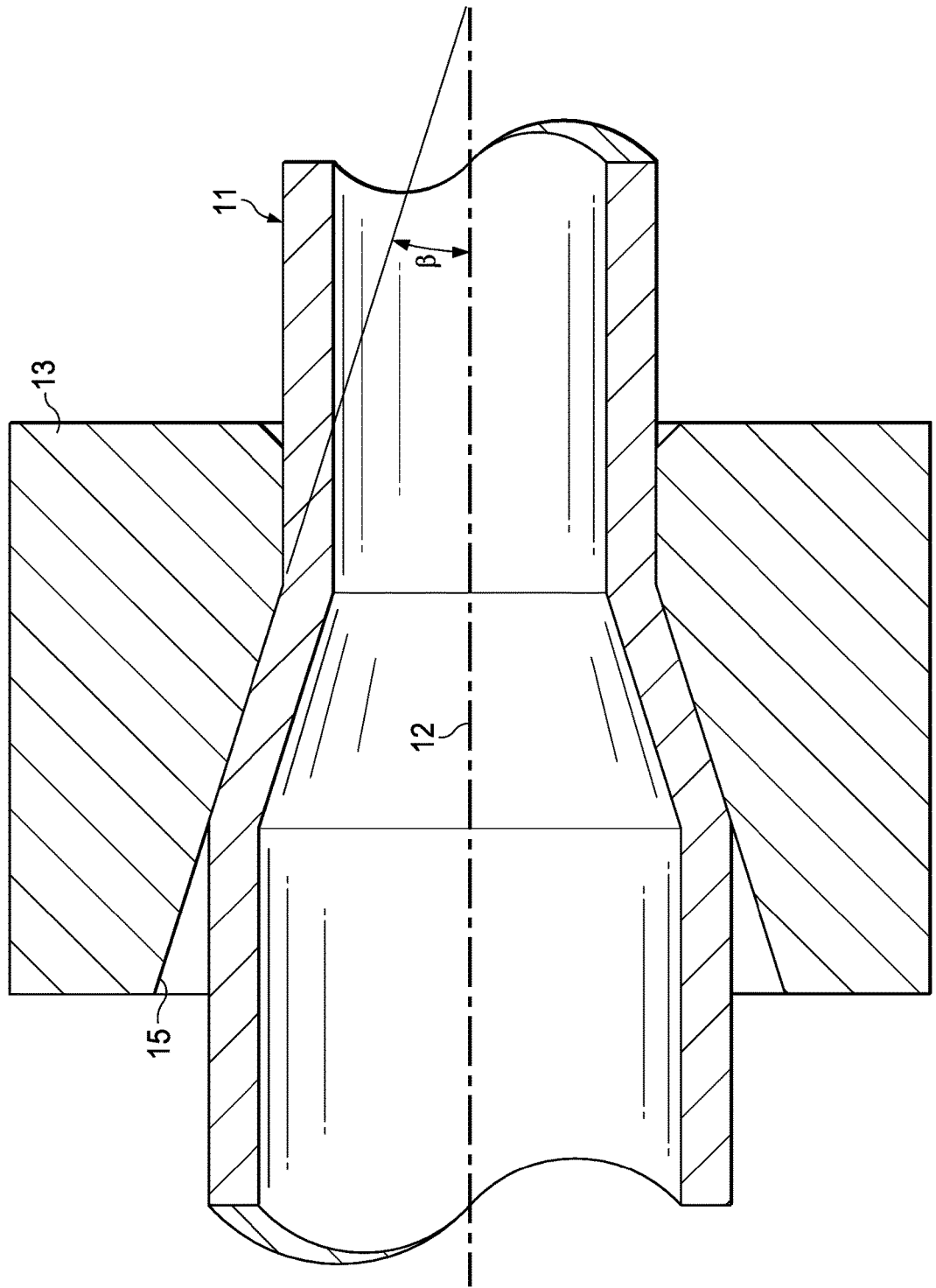
FIG. 11 is a side, cross sectional view of a prior art swage liner reduction process.
Figure 12:
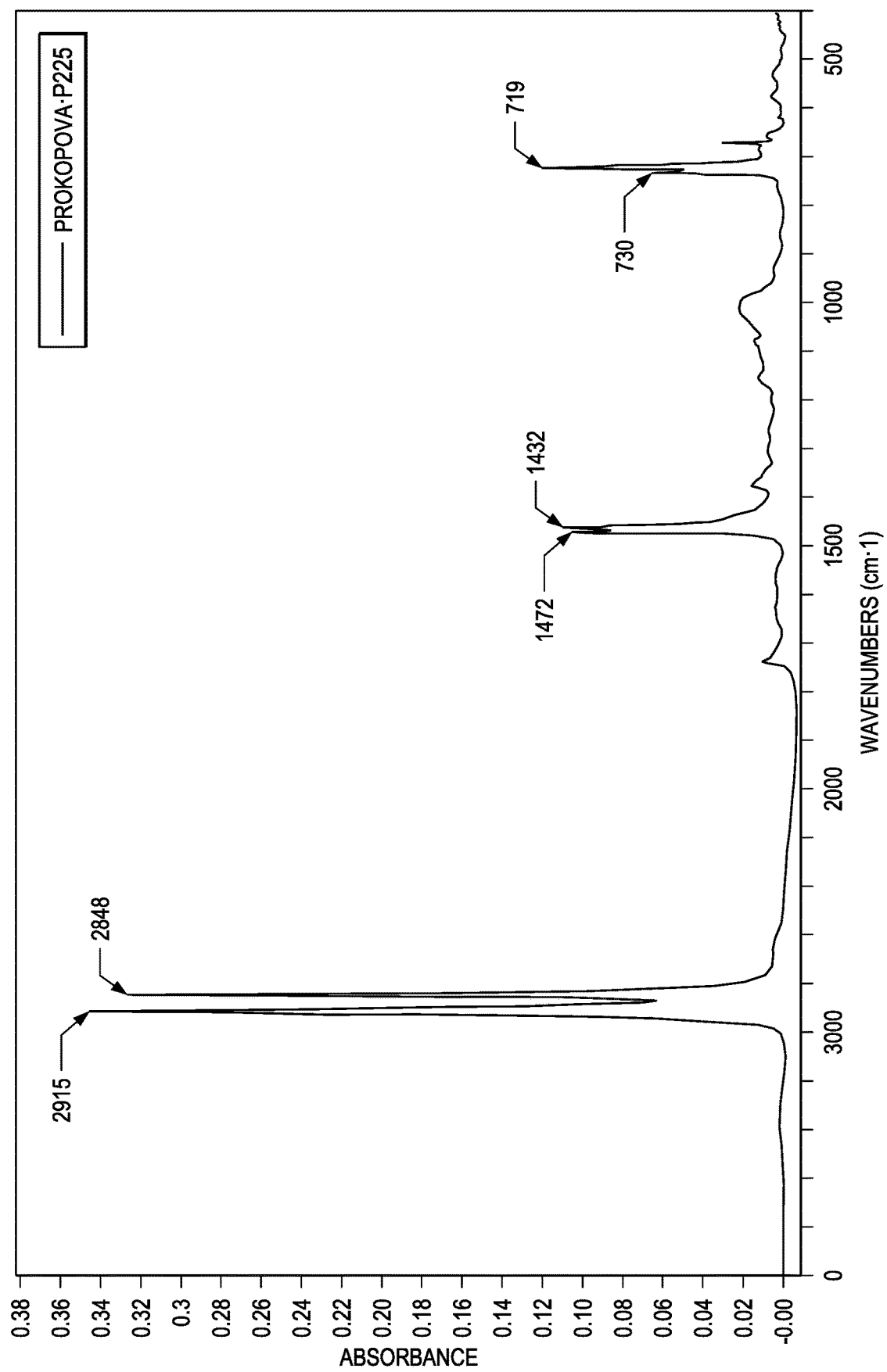
FIG. 12 is a graph of the Infrared Wavelength vs Absorption Curve for Polyethylene

In order to appreciate the advantages of the present invention, it is necessary to briefly refer to the prior art "swage-lining" process. FIGS. 2 and 11 are simplified representations of a prior art "swage lining" die of the type previously described in the Background Discussion. A polymeric tubular 11 is being drawn though the die 13 by a pull-head (not shown) located to the right. The angle of the die at surface 15 effects a downsizing of the OD of the tubular. The angle "α" of the surface 15 is approximately 20 degrees with respect to the centerline 12.

FIG. 2 is a simplified quarter sectional view of a polymeric tubular 35 being pulled through a prior art swage die 37, of the type shown in more detail in FIG. 11. Note the die angle "α" exerting constant friction on the tubular, as Force is being applied in the direction of the arrow.

Note also that some slight memory recovery may occur at the region indicated as 39 in FIG. 2. The overall result of the process shown in FIG. 2 is high forces applied to the tubular resulting in high axial elongation and measurable wall thinning (stretch) of the tubular. A number of critical differences exist between the prior art process depicted in FIGS. 2 and 11 and the process of the invention, as will be explained hereafter.

FIG. 1 is a simplified, partly schematic view of the component parts of the apparatus used in the manufacturing process of the invention. The process of the invention can utilize an optional welding system in which short to long lengths of SMP tubulars are co-joined (by welding or fusion) to the end of the SMP pipe being re-shaped and installed, while the SMP pipe is in motion. This keeps the tail end "short" to minimize the drag-weight of the initial start-up static friction load and start-up dynamic friction drag-load, so that cumulative pull stress at the "nose" of the SMP installation pipe remains below its yield stress or critical cold-flow creep-stress, and so the tension load simply opposes diameter recovery, instead of creep-elongating the front section of the SMP undergoing installation.

Figure 10:
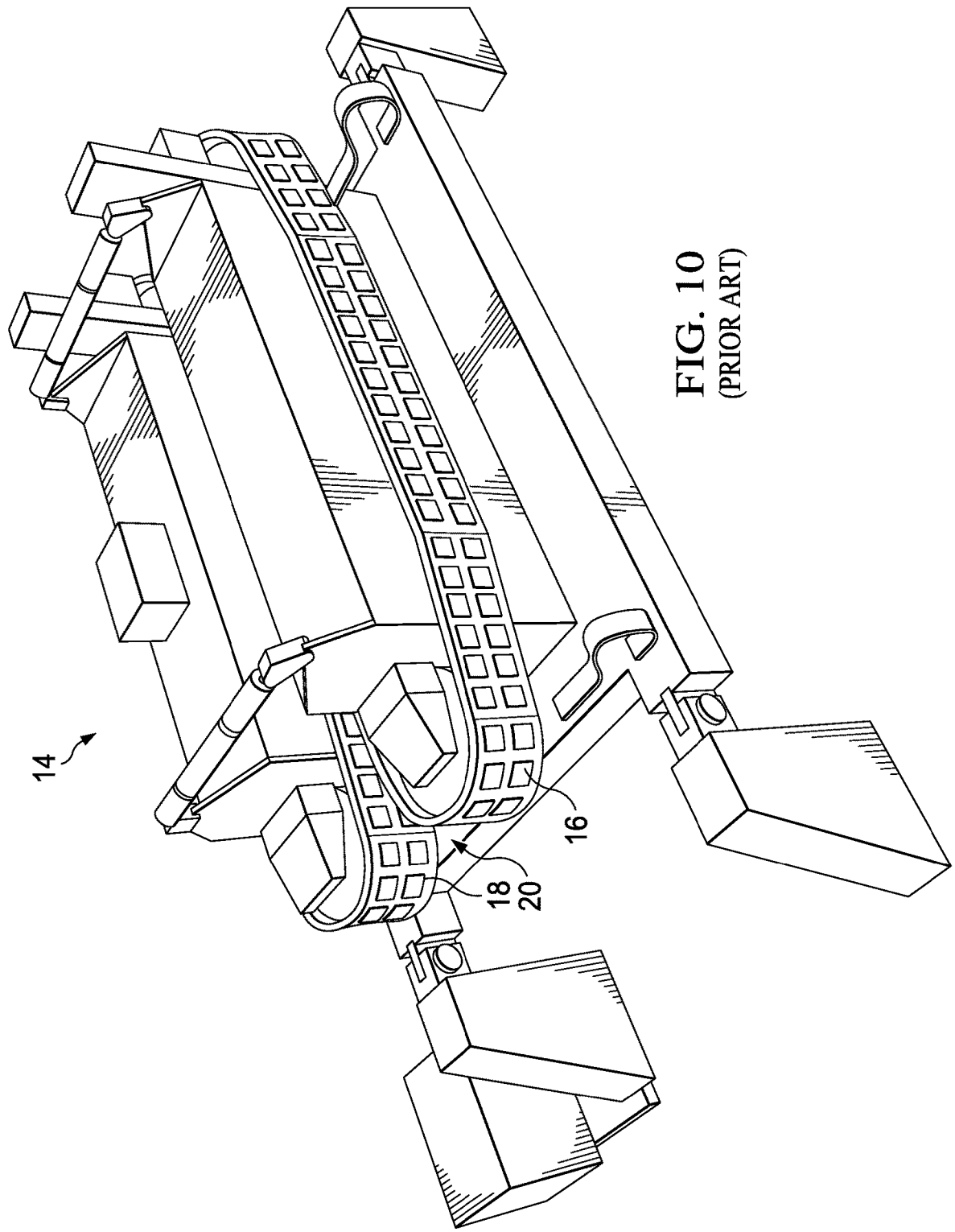
FIG. 10 is a representative view of one type of pipe tensioner device which is commercially available at the present time.

In the simplified view of FIG. 1, an SMP tubular 17 is being transported on rollers 19 toward a pipe tensioning mechanism, in this case a load balancing capstan/tensioner 21. FIG. 10 is a perspective view of a known pipe tensioner 14 of the type used, for example, in laying off-shore pipe lines from a ship. The gripping belts, 16, 18, are used to tension the tubular as it is fed through a central opening 20. The direction of travel is from left to right as viewed in FIG. 1. The pipe tensioner 21 pulls the long SMP tubular along, providing constant velocity into a pipe deformation mechanism, i.e, a tool box 23. The tool box provides deformation and wall thickening and may incorporate optional lubricants, temperature application and ultrasonics, as will be described more fully hereafter. After the tool box 23, the SMP tubular is pulled into the host pipe 25 by means of a high strength pull-head 27 and load controlled winch assembly 29. Tension in the pulling cable 31 increases with the installed length of tubular. A load feedback controller 33 preferably provides a controlled tension differential and prevents premature "memory recovery" of the tubular.

In the practice of the method of the invention, a deformed SMP cylinder is installed in the host pipe after the deformation tool apparatus by pulling. When pulling, the SMP tubular is typically dragged forward under tension. The pull-head assembly chosen must be sufficient for the project installation length. In certain high-risk situations, the pull-head assembly head preferably exhibits a tensile load capacity equal to or greater than the tensile strength of the SMP tubular itself. The applied tension load is a predictable variable load, because the pull load must hold a constant base tension to prevent or slow diameter recovery until the SMP pipe is completely through the host pipe. The pull-load must also increase as the frictional drag increases with the increasing length of the SMP pipe within the host pipe, and with the multiplier load of host pipe bends. The technology for predicting the insertion loads has been in existence for many years, following the pulling and pushing installation equations of one long smaller cylinder inside another long larger cylinder. Example engineering information, available since the 1980's was first published in the AEIC Publication G5-90 "Underground Extruded Power Cable Pulling, AEIC Task Group 28"; see, also, IEEE Standard 1185-1994, "Guide for Installation Methods for Generation Station Cables"; and, "Installation of Optical Cables in Ducts", by Griffioen (1993), which discusses the theory of pushing and pulling of long cylinders of one inside the other (Chapters 2 & 3).

It is important during the practice of the method of the invention that, when installing the temporarily deformed SMP tubular by axial pulling it into and through the host pipeline, the applied tension is sufficient to oppose the inherent recovery of the SMP cylinder towards its original diameter. The tension "attempts" to 'neck-down' the long length tubular, while the SMP tubular is dynamically trying to recover OD. The force of the axial pull-tension should be sufficient to off-set, balance, equal, or slow down the OD recovery process, thus enabling very long lengths to be installed in the host pipeline, prior to OD recovery, which locks the SMP cylinder in place, uniting it with the host pipe and forming the composite pipe structure. OD recovery of the cylindrically deformed SMP cylinder is triggered by the release of axial tension, and the un-constrained memory recovery of the deformed polymer pipe.

The first mechanical component used in the preferred method of practicing the invention thus involves the use of the SMP pipe tensioner mechanism. The tensioner mechanism pulls the tail-end pipe segments forward, and simultaneously pushes that heavy, large-diameter pipe through the deformation tool apparatus" and then into the host pipe, where thereafter, the inserted pipe is simply held in axial tension sufficient to prevent diameter 'memory' recovery and to overcome drag friction, at a axial tension low enough to minimize axial creep elongation of the SMP cylinder length undergoing insertion. This provides uniform speed for consistency in the lining process and allows for longer and longer installation lengths through, for example, a subterranean pipeline. Pipe Tensioners, of the general type under consideration, are used at the present time on very large pipe, typically for ship-borne pipe-lay vessels, and have never previously been used to manage SMP pipe manufacture and installation for the purpose of maintaining a desired ratio of wall thickening and minimum axial elongation in the type of applications presently envisioned. Examples of large diameter Pipe Tensioners can be found in the published literature, including: www.controlflow.com/products/westech/linear-pipe-tensioners.

It is important in the practice of the invention that the use of such a large diameter pipe tensioner provide a predictable speed for consistency on SMP pipe processing to give uniform deformation, uniform 'memory' in radial recovery, with minimum axial elongation. The host pipeline geometry can have elbows, sag bends, side bends, and over-bends. These pipeline components multiply the drag-load required to keep the forged SMP pipe moving forward. On some occasions, as the loads rapidly multiply, the pull-nose used to pull the SMP can be temporarily stopped and the axial nose tension becomes isolated from the tail end of the SMP pipe. Under such conditions, the length of pipe intermediate between the tail end and nose end SMP pipe can begin diameter recovery, potentially locking the SMP pipe 'in place' while being only partially installed along the project length.

Alternatively, the frictional drag load on the pull-nose can build and build, and then suddenly release, causing the SMP pipe to suddenly accelerate and "jump" forward through the deformation mechanism at high speed for a short section until the dynamic forces come to equilibrium. Such surges in axial speeds through the deformation mechanism impose less diameter reduction and wall thickening (consequently a smaller radial clearance between SMP pipe and the host pipe ID) than optimal and balanced compression strain at slower constant speed. The important aspects to the SMP pipe tensioner, is that it provides constant processing speed without surging, uniform radial deformation and wall thickening and memory recovery due to that constant speed, and provides control within and over the process, not previously disclosed in Prior art.

Figure 3:
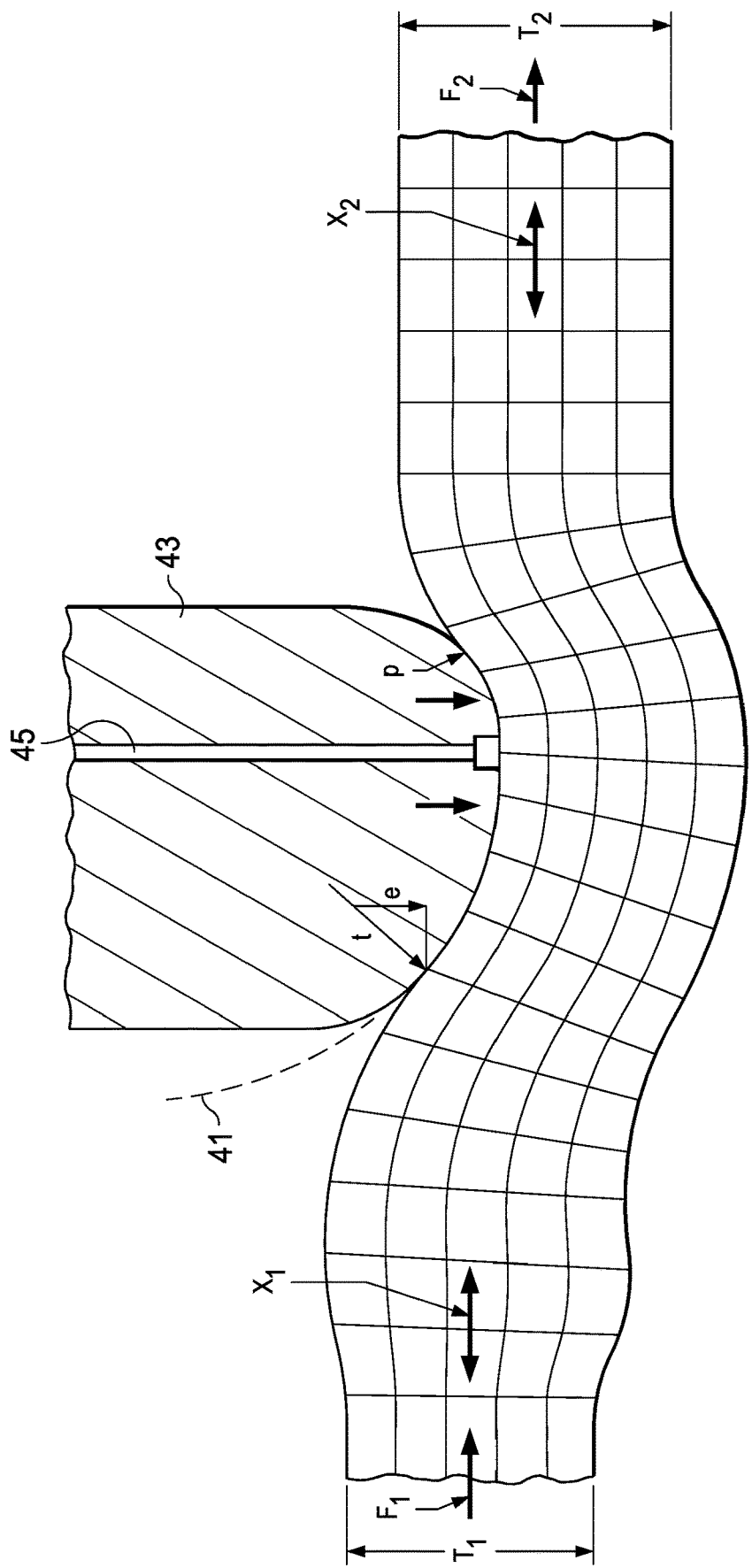
FIG. 3 is a view similar to FIG. 2, but showing the use of a parabolic curved die in the pipe deformation mechanism which provides a force balance and consequent minimal axial elongation and measurable radial compression wall thickening of the liner.

FIG. 3 is a simplified, partly schematic view of a portion of the pipe deformation mechanism corresponding to the same portion of the prior art process shown in FIG. 2. The pipe deformation apparatus of the invention uses specialized dies or working element which have a parabolic curved working surface. As shown in FIG. 3, the parabolic curve 41 of the die 43 applies variable frictional resistance and increasing radial compression "c" with a radial tangent force "t" as the tubular moves along the curve. One or more ports 45 may be provided for the application of temperature control, ultrasonics and/or lubricants, as will be more fully described. There is also a push-off force "p" applied at the exit region. As will be further explained, the tubular is subjected to both an entry force $F_1$ as it enters the deformation mechanism and an anti-recovery force $F_2$ upon exiting.

The use of parabolic work surfaces, as well as the optional temperature control, ultrasonics and lubricants introduced through the port 45 (FIG. 3) provides more balanced forces while minimizing the axial elongation of the tubular as well as measurable radial compression and wall thickening. Note that in FIG. 3, $T_2 \geq T_1$, $X_2$ is approximately equal to $X_1$ and $OD_2$ is less than $OD_1$.

Figure 4:
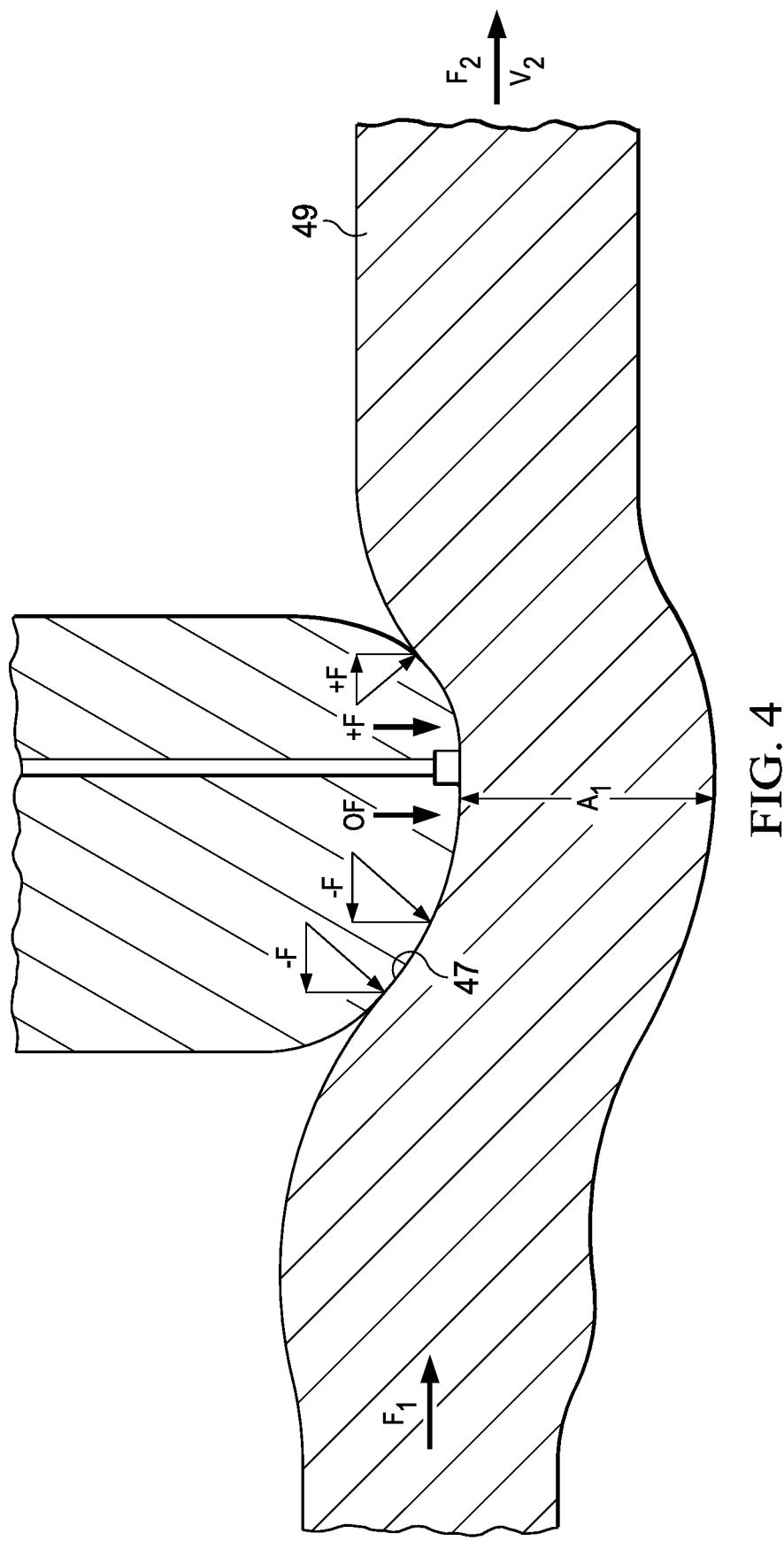
FIG. 4 is another view, similar to FIG. 3, of the pipe deformation tool used in the process of the invention.

FIG. 4 is another simplified representation of the parabolic curvature of the die at the region 47, as well as the force vectors along the curve between the entry and exit of the SMP tubular 49 from the deformation reduction tool. Note that there is radial wall thickening with minimal stretch at an area designated generally at "A".

Figure 5:
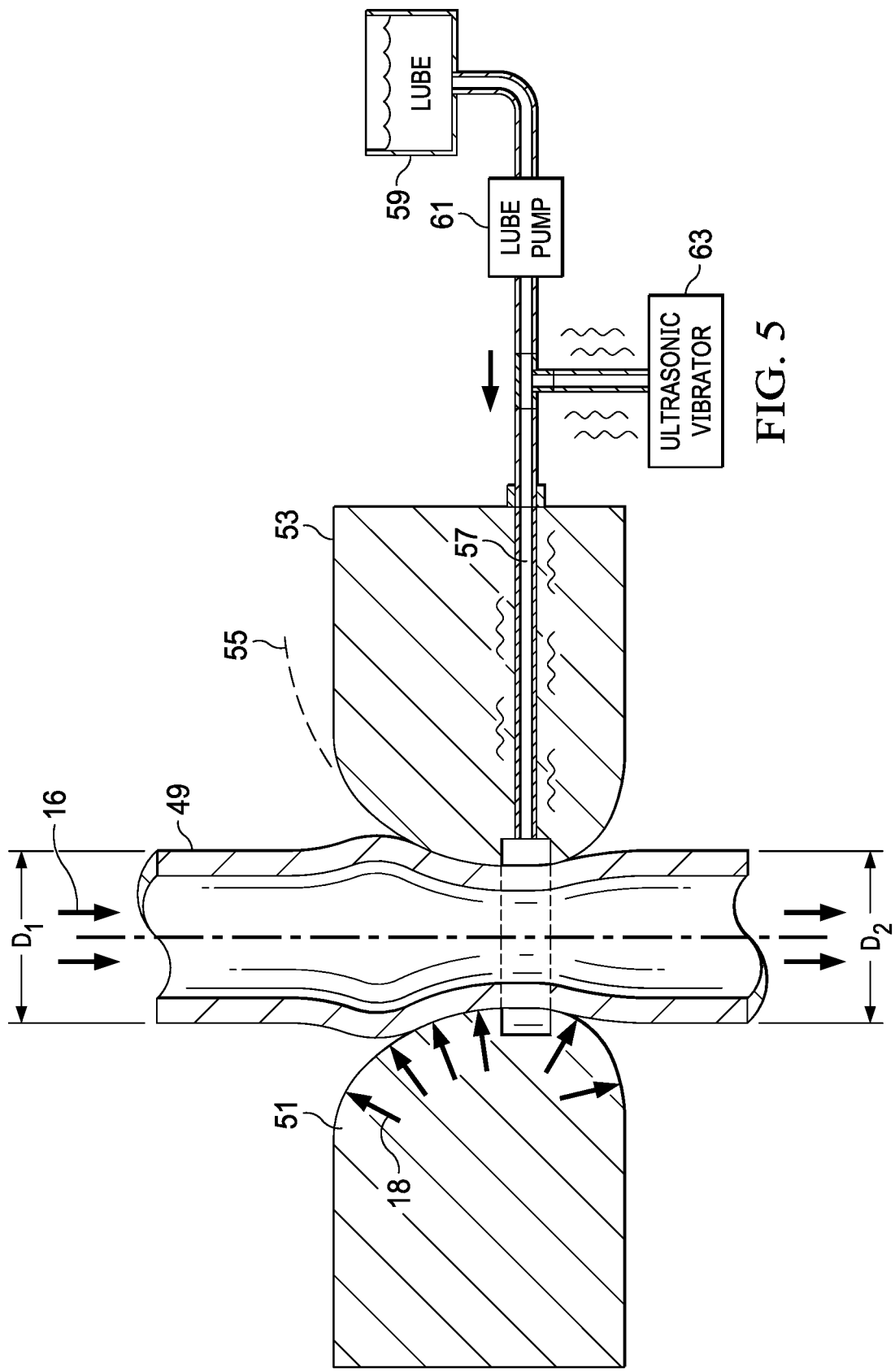
FIG. 5 is a side, simplified view a portion of the process of the invention showing an SMP tubular being fed through an OD deformation tool featuring parabolic reduction elements.

FIG. 5 is a more complete view of the deformation tool mechanism (tool box) portion of the process showing the SMP tubular moving in the direction of the arrows 16 through a pair of parabolic dies 51, 53, again having the parabolic curve 55. In this case, the die port 57 is in fluid communication with a supply of lubricant 59, the lubricant being supplied to the surface of the tubular by the lube pump 61. The use of the optional ultrasonic vibrator 63 helps to reduce friction and allows for a larger reduction per tool without failure. The arrows 18 show the radially compressive forces being applied.

It is found that material internal shearing strength is decreased by ultrasonic vibration, which can be attributed to acoustic softening effect, considering the absorbed acoustic energy. The sonic velocity of polyethylene is about 3000-ft/sec, and sound waves are transmitted through the mass of the pipe wall. Application of ultrasonic energy reduces the static stress necessary for plastic deformation of materials, to reduce both deformation load and energy; the effect being known as the acoustic softening effect (ASE). Ultrasonic vibration promotes material flow under load, decreased resistance to flow, and increases overall plasticity. Additionally, the heat generated internal to the SMP pipe wall coming from both frictional work and plastic deformation, and IR adsorption, is slightly added to and influenced by ASE. The ultrasonic vibration helps enable slippage in the polymer's inter-molecular region between macro-molecular structures, somewhat analogous to harmonic vibrations fluidizing or consolidating poured concrete or particulate suspensions. Powerful single frequency or multi-frequency ultrasonic generators are available from manufacturers such as Ransohoff, Inc or Blackstone-NEY Ultrasonics.

Figure 6:
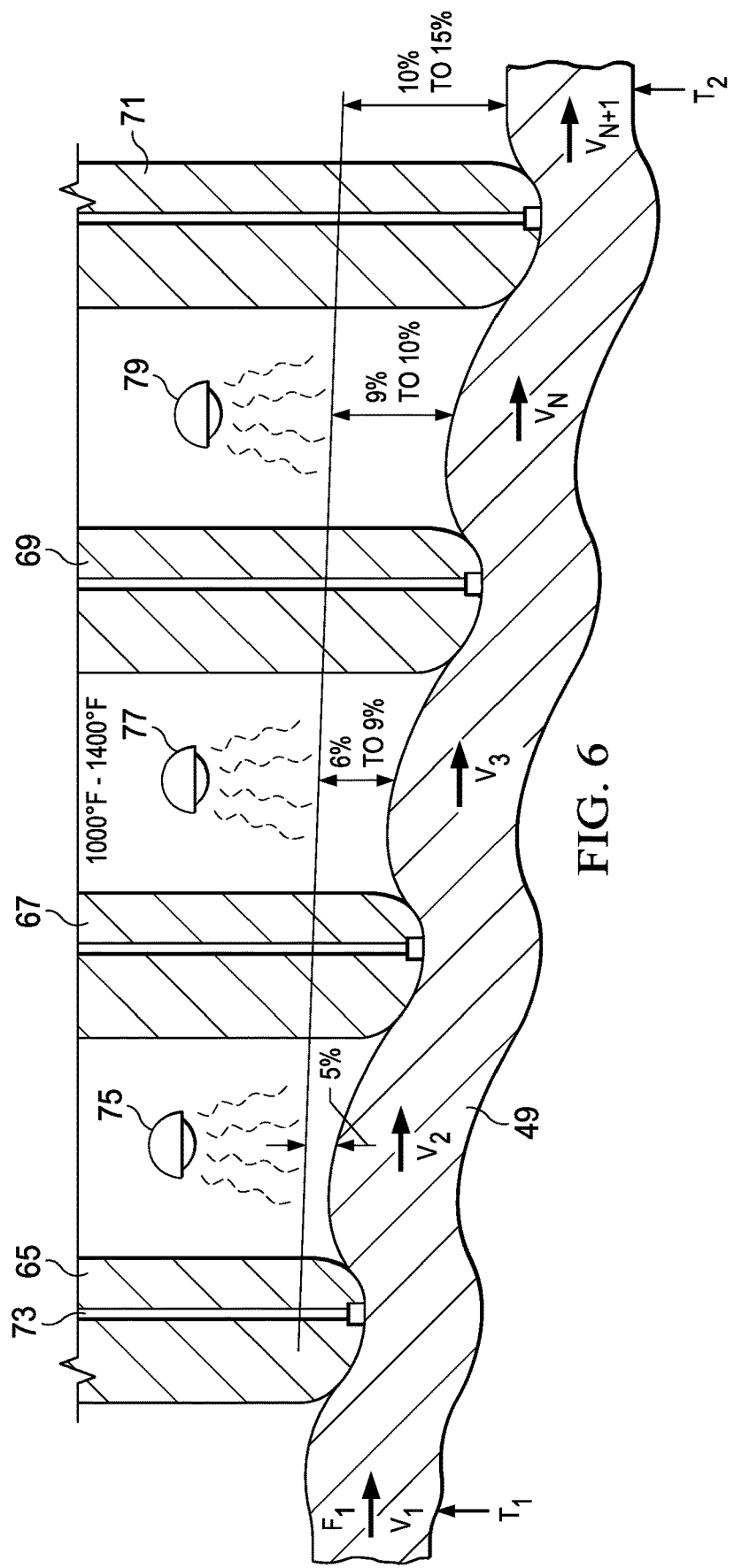
FIG. 6 is a simplified, partly schematic view of another step in the inventive process in which the SMP tubular is fed through a series of parabolic reduction tool elements, where the SMP tubular is also subjected to circumferential, frequency-tuned infrared red lamps.

FIG. 6 is a simplified view of a preferred mechanical arrangement for the practice of the invention where a series of deformation mechanisms are arranged in a line. The sequentially arranged compression elements 65, 67, 69, 71 each have the previously described temperature controlled circumferential lube support port 73, pressurized with ultrasound. Another feature of the arrangement shown in FIG. 6 is the presence of the circumferential frequency-tuned infrared (IR) lamps 75, 77, 79.

Figure 7:
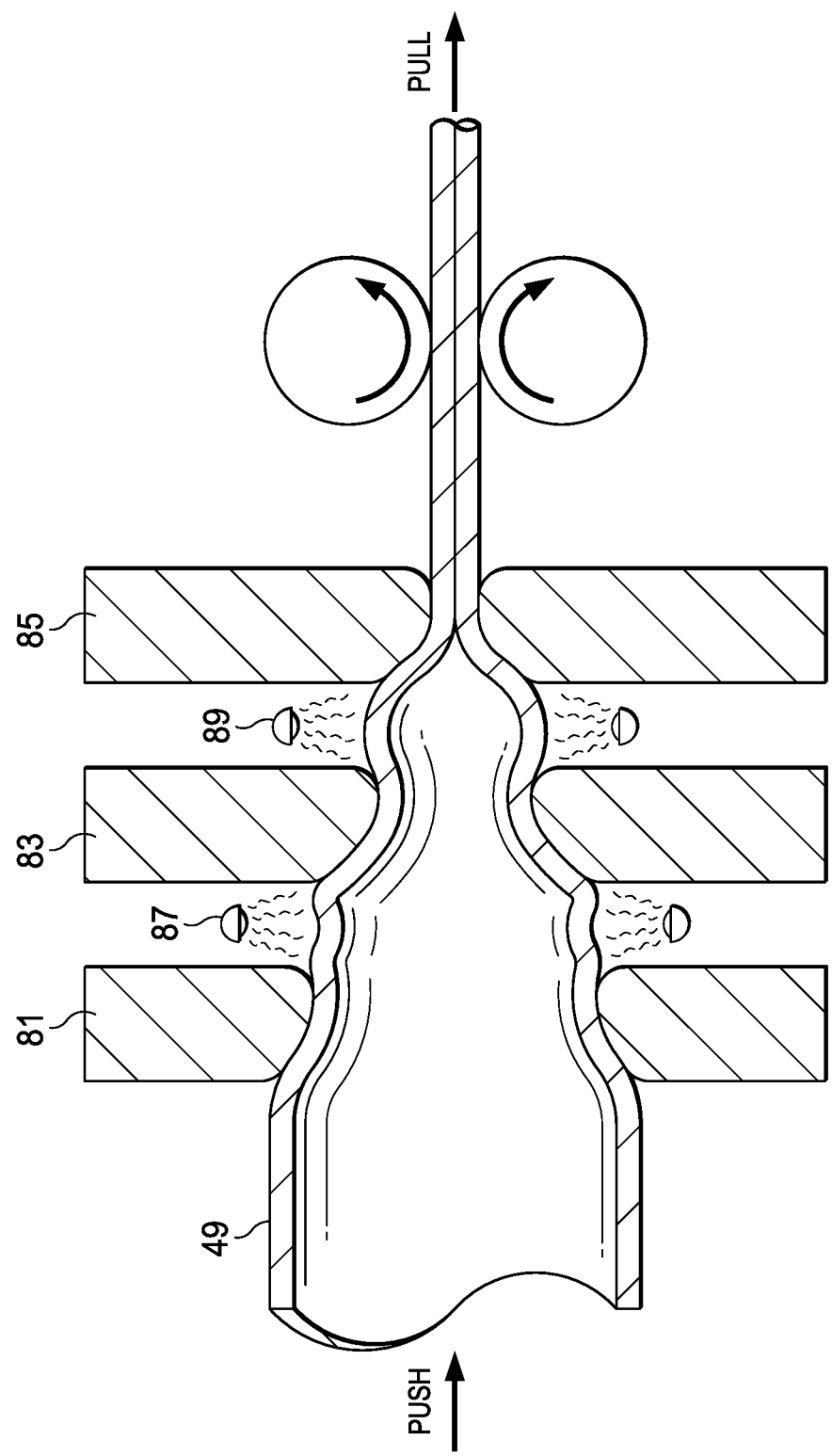
FIG. 7 is s schematic view of the SMP tubular passing through the reduction tool, showing the steps in the SMP tubular deformation.

FIG. 7 is a simplified, pictorial representation of a preferred arrangement for the process of the invention where the tubular 49 is fed through three successive deformation mechanisms 81, 83, 85, with intermediate exposure to the IR lamps 87, 89. The left hand arrow in FIG. 7 illustrates the pushing force applied to the tubular, while the right hand arrow illustrates the accompanying pulling force.

FIG. 8 is a simplified cross sectional view of the tubular 49 within the host pipe 25, which is intended to illustrate the release of installation force in somewhat of a pictorial fashion. The entry end of the pipe liner is on the left as viewed in FIG. 8 and the exit end is on the right. A tight compression friction grip exists at the region generally shown as 91. The direction of recovery is shown by the arrow "Re" in FIG. 8. Major memory recovery occurs at about the location 93 with OD enlargement and wall thinning. This is then followed by a slight axial contraction and decreasing gap between tubulars at the region 95 near the exit end. There is a controlled slow release force present at the exit end, illustrated by the arrow "Rf."

Another important principle incorporated into the practice of the invention is the discovery that SMP's can change physical properties (such as the Young's Modulus of Elasticity, Compressive Strain Limit, and the Elastic or Viscoelastic Strain Response) by the alteration of the SMP temperature before, during, and/or after SPM pipe manufacture. Taking advantage of the change in properties of the SMP material can promote the ease of manufacture and installation of SMP Tubulars.

In the past, the SMP tubular has been treated by various heat sources such as hot gases in convection and induction environments. However, in the process of the invention, Infrared Radiation (IR) is the preferred method used to alter the SMP tubular's physical properties, prior to the SMP pipe manufacture. The SMP pipe surface and thru-wall mass is not easily temperature treated by the process of conduction. Additionally, the pipe surface and thru-wall mass is very in-efficiently temperature treated by convection using thermally controlled air, because the mass of the air molecules is low, and cannot efficiently convey heat onto the pipe at the laminar pipe-surface air boundary. Raising the temperature of a thick wall SMP pipe to a desired malleability temperature, can take hours, because the large SMP mass per foot and its high specific heat. Convection processes consequently limit the speed of SMP pipe installation to un-economical production and installation speeds.

IR energy is characterized by its wave frequency. SPM's are transparent to many bands of IR wave-energy frequencies, and, are highly absorptive of one or more narrow bands of IR wave-energy frequencies. The process of the invention uses IR energy generated at selected IR wave-frequency bands, which are absorbed by a specific SMP. The SMP's absorb the specific frequency band of IR energy wave through the tubular OD and into the thru wall thickness, where-in it converted into thermal heat conducted throughout the SMP tubular's thru-wall thickness in a quick and efficient manner. Polymers can absorb energy up to a certain watts per square inch density flux. In the practice of the invention, the produced watt density flux of the specifically absorbed IR frequency band(s) is kept at or below the SMP's maximum absorbable watt density flux limit.

Figure 9A:
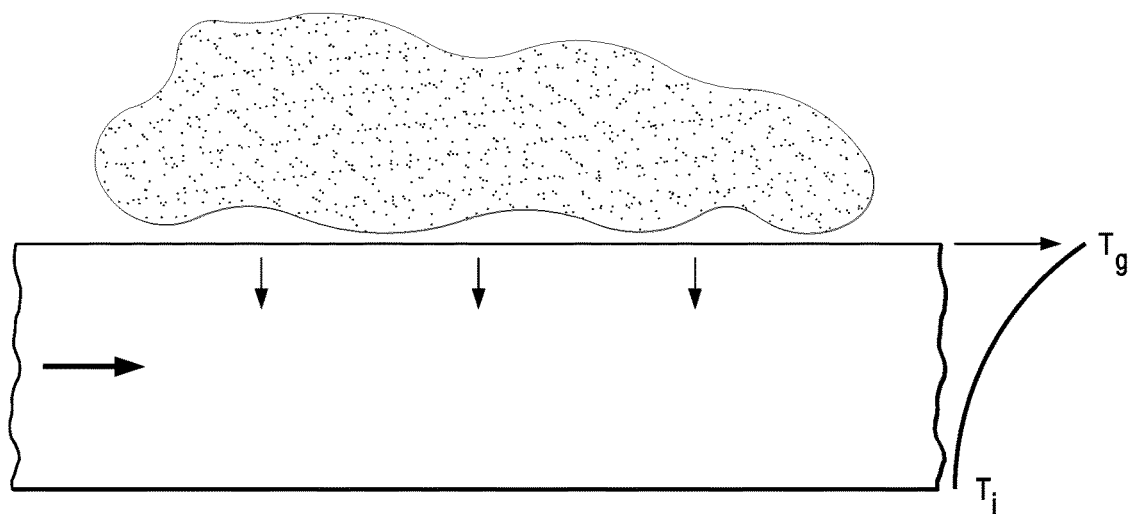
FIG. 9A is a view of a prior art process which uses a heat source to affect the deformation characteristics of the SMP tubular.
Figure 9B:
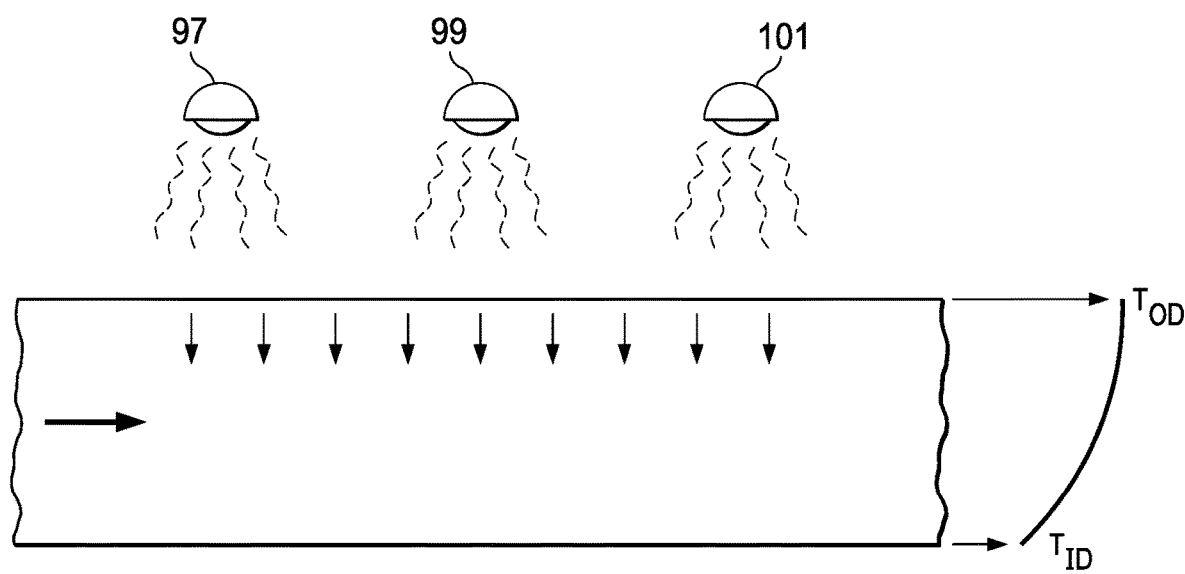
FIG. 9B is another view of the new step in the process of the invention in which a series of infra-red heaters (IR) are used in the process to apply a low thermal gradient across the wall thickness of the SMP tubular.

FIGS. 9A and 9B are simplified representations of the prior art technique (FIG. 9A) using, for example hot gases for temperature control and the improved technique using IR heaters shown in FIG. 9B. The prior art process of FIG. 9A is characterized by the use of convection or conduction with consequent thermal inertia, low mass gas transport, low efficiency, a low number of watts per square inch of pipe being treated, and low residence time and high thermal gradient across the wall thickness (Ti to Tg).

The improved process of the invention, which uses the IR heaters 97, 99, 101 produce deep penetration at a tuned IR frequency, high conduction, a high watts per square inch, high thermal efficiency/absorption. The IR power can be matched to the velocity of the moving tubular with a resulting thermal gradient across the wall thickness. The IR energy penetration heats the SMP pipe wall, reducing its elastic modulus, reducing its resistance to diameter deformation, such that the reduced loads from downsizing can be otherwise be mobilized to enable the manufacture of longer length composite bi-layer pipes. The IR heating can be optionally applied for longer length pipeline installations, and in colder weather climates. The IR heating is not intended to create a uniform wall temperature, but rather to generate a thermal gradient across the SMP pipe-wall, which net effect is to reduce the overall radial strength of the tube, to reduce resistance to temporary diameter reduction, enabling easier and longer composite pipe construction. Prior art use of warmed gas is very in-efficient and in-effective, being only a slow surface warming. This advancement heats immediately by penetrating wave energy "tuned" absorption, versus surface gas-film thermal conduction, allowing faster speed of construction.

The preferred deformation mechanism used in the practice of the invention will now be further described. The preferred process uses a special type of deformation mechanism to re-shape the frigid, ambient or warmed temperature SMP tubular pre-form to its temporarily smaller diameter. The deformation tool apparatus preferably consists of the assembly of one or more orifice forging rings positionally locked in a static frame, so as to "work" the SMP tubular as it is pushed through, pulled through, or pushed and pulled through the forging rings. Pushing the SMP tubular through one or multiple forge-rings builds axial compression resistance stress, which results primarily in compressive strain radial wall thickening of the tubular, with minimal axial elongation, as the SMP cylinder is forged into a smaller diameter. Pulling the SW' tubular through one or multiple forge-rings results in modest wall thickening, but primarily axial elongation and stretching.

To control the applied pulling loads so that the SMP pipe does not elongate excessively under load, especially for larger diameter SMP pipes at much longer lengths, an optional load controller may be used. Initially the tensioner pull load is high. The pull-push tensioner absorbs the initial drag-load of the assembled, long SMP pipe string entering the tool-box. As the pipe length entering the tensioner shortens, its drag load decreases. The SMP pipe is not drug through the tool box, it is fed into it, such that there is no pull-nose tension required to drag the initial pipe string up to the tool-box. The frictional drag resistance through the downsizing tool box is relatively constant. The SMP pipe length pull-nose exerts sufficient tension to pull it through the tool-box and hold additional tension sufficient to keep the SMP pipe from diameter recovery. As the downsized SMP pipe passes into the host pipe, the pull-head tension increases slowly with every foot of additional "drag-load" moving into the host pipe. At some installed length, the pull-head tension can become excessive and start necking-down the SMP pipe. The SMP pipe pull-head load (force) is monitored. To prevent pull-head loads form becoming excessive, the controller's load set point speeds up the tensioner velocity feeding the tool-box, so as to partially off-set the sum of the tool box drag resistance force, and the installed SMP pipe's frictional drag-load inside of the host pipe. In this way, by balancing the difference between the push-feed load and the pull-installation load, the pull-head tension force is controlled within an upper and lower load boundary, so that the SMP pipe neither prematurely OD recovers, nor necks down and elongates excessively during the time duration of liner installation. The SMP pipe wall tension stress is maintained in an acceptable range of viscoelastic creep stress intensity, by means of load control between the tensioner and pull-head.

According to the teachings of the invention, the previously described Pipe Tensioner uses pushing, pulling, and combined pushing and pulling, to achieve the desired balance between radial wall thinning and axial elongation. The compressed radial wall ring-strain wants to recover towards its original larger diameter, by giving up its thickened wall as it recovers and enlarges, resulting in radial wall thinning recovery and reduction of compressive stress and strain. The axial elongation also stores recoverable SMP tensile strain, like the 'Chinese Finger' effect, such that when elongated, the cylinder gets longer and smaller in diameter, and when contracted, gets shorter and larger in diameter. The use of the Deformation Tool of the invention, with correct forge-ring geometry, when used with pushing or pulling, or pushing and pulling, generates the desired ratio between cylindrical SMP's recoverable radial wall thickening and recoverable axial elongation.

The process of the invention also preferably uses SMP materials in tension or compression, within short-term strain limits. Above a compressive strain limit determined at a specific temperature, many polymeric materials will "crush", suffering permanent non-recoverable compressive deformation. Above a tensile strain limit determined at a specific temperature, many polymeric materials will molecularly dis-entangle, suffering permanent non-recoverable tensile deformation. The present process, in its preferred form, uses SMP's with elastic deformation limits of less than or equal to 16% in compression, and/or less than or equal to 13% in tension.

The preferred deformation tool apparatus used in the practice of the invention consists of a rugged, high-load tolerant frame, within which are one or multiple orifice forging-rings (illustrated schematically in FIGS. 4-7), used to cold or hot forge the SMP cylinder to a temporarily smaller diameter. Certain materials exhibit the property of visco-elasticity, analogous to a Kelvin-Voigt and Maxwell material. At a given temperature, when "worked" too fast through the forge-rings, the SMP cylinder resistance loads are extremely high. At the same temperature, when "worked" slowly through the forge-rings, the SMP cylinder can shed the deformation load by progressive creep-strain. At a given temperature, when the percentage compressive or tensile strain is large, the load resistance to the deformation is very high. At a given temperature, when the percentage compressive or tensile strains are low, the load resistance to the deformation is lower. The resistance to diameter deformation is a function of temperature, percent deformation, and speed of deformation. These conflicting properties can be used advantageously by using one or more, preferably several forging-rings, which sequentially deform at small percentage reductions (lower forces), and are sufficiently, axially separated within the deformation tool apparatus to enable viscoelastic creep strain (dimensional change) during the time delay between entry into the next forging ring, resulting in larger wall thickening and slight elongation, at reduced loads. The forging rings are advantageously separated from each other in the range of 2-inches apart up to 24-inches apart, depending upon many variables such as diameter, forward velocity, temperature, wall thickness or dimension ratio.

Reduced loads result in longer installation lengths. The deformation tool apparatus is arranged to provide a separation distance between the successive forge-rings to enable partial SMP cylinder diameter recovery enlargement, so that when passing through the next forge ring and the next subsequent forge rings, the partially recovered SMP cylinder enters at a diameter slightly larger than the diameter it possessed when exiting the prior forge-ring. The repeated down-size "working" of the SMP pipe diameter results in a higher percentage of radial wall thickening, versus axial elongation.

As has been emphasized, an important aspect of the practice of the invention is the use of orifice forge-rings with a parabolic curvature through the ring entry and exit. Prior art has used angular tapers, primarily as applied to metals. The problem with angular tapers is that they can be 'long' resulting in high frictional loads and those forces can be inclined at non-perpendicular angles to the SMP cylinder surface, both resulting in undesirably large axial SMP stretch. With SMP cylinders, the short parabolic curvature applies deformation strain perpendicular to the SMP cylinder surface as it changes shape as it passes through the forge-ring, resulting primarily in ring compression, with minimal axial elongation. SMP cylindrical ring compression resulting in wall thickening is preferable over axial elongation. It is desirable to maximize radial compression versus axial elongation, as the installation objective is to allow the SMP cylinder to recover radially so as to be in ring-compression, tight to the ID of the host pipe. The parabolic curvature aids in maximizing the balance (ratio) between percent radial wall thickening and percent axial stretch.

Preferably, the series of multiple orifice forge-rings are separated sufficiently apart to develop axial compression between orifice forge-rings. As the SMP cylinder exits one ring and moves along to the next, the wall exits the first forge ring as somewhat thickened, and slightly elongated. The distance between forge rings is such that when compared to the macro-pulling speed, as the SMP cylinder is progressively reduced, it gets progressively longer, such that its axial velocity increases between forge rings, thus "pushing" the progressively deformed ring into the next forge ring at a faster speed, driving it forward, and loading the cylinder more in axial compression, which results in better radial wall thickening with reduced elongation. Hence, multiple forge rings, or sets of forge rings, can be advantageously positioned apart to maximize radial wall thickening, as compared to a single forge-ring.

Another feature which can be advantageous used with respect to the forge-rings is the feature of harmonic vibrational enhancement. Real polymers do not creep under deformation load with a single creep-mode. Molecular segments of varying lengths contribute to the overall creep-rate, with the simpler and shorter segments relaxing much more quickly than the longer ones. This leads to a distribution of molecular creep-rates. This distribution is most effectively modeled by the Wiechert Polymeric Creep-Rate Model, with its many springs and dash-points. It has been discovered that when certain polymeric materials are subjected to high speed vibration, they are more easily worked, as the vibration force from 'waves' mobilize the shorter molecular structures, promoting a higher creep-rate (reduced deformation loads and increased rates of permissible deformation, i.e., line-speed). Harmonic vibration provides for faster deformation and installation line-speed.

The vibrational harmonic is most easily applied by a fluid in direct contact with the surface of the SMP cylinder as it passes through one or more forge rings, within the Deformation Tool Apparatus. The vibration can be induced by ultrasound, or high frequency pulses of pressure. The vibration harmonic fluid can be, for example, water, synthetic chemicals, vegetable oil, or other organoleptic fluids. The vibration fluid usually is thermally tempered to be at the same temperature as the SMP tubular passing through the forge-ring, so as to not alter the SMP thermo-mechanical properties, as the tubular is being processed. Such fluids have also been found to have beneficial effects when containing solid lubricants such as graphite, or, molybdenum di-sulfide, which attach to the surface of the SMP cylinder. Solid lubricants of this type aid in reducing forging die frictional drag, resulting in more radial wall thickening and less axial elongation. As a result, such solid lubricants aid in the installation of longer lengths of SMP tubulars inside of host pipes, by reducing frictional installation drag-loads between the SMP pipe and the host pipe.

One principle of the improved process of the invention is thus to provide a deformation tool apparatus which features multiple forge rings of mechanically variable diameter, and, with means to axially position the multiple forge rings at variable distances from one another, to enhance radial wall thickening and to minimize axial stretch.

The preferred forge-rings, with parabolic curvature on its ID entrance and exit, may be bolted to a master mounting plate in multiple segments. In most applications, there will be multiple segments, i.e., more than two and less than 10 circumferential segments. The individual segments can be loosened at the master mounting plate and, can then be safely, controllably, radially moved outwardly to release the ring compression from the SMP cylinder, once the SMP pipe is in place in the host pipe. Prior art provides no safe way to release the deformed SMP pipe from the deformation tools one the axial pipe installation process has stopped.

The parabolic entry and exit profile of the Deformation Tool assists with radial compression and wall thickening, while minimizing axial elongation, because as the SMP pipe enters the parabolic curvature, the forces are perpendicular to the tangent surface of the SMP at any point of mutual contact, promoting radial compression without axial tensor vectors. Alternately, upon exit from the forge-ring orifice, with the multiple forge rings spaced sufficiently apart, the curvature of the slightly diameter recovering SMP pipe "pushes" against the exiting parabolic curvature developing an axially forward exit force, while incrementally lengthening due to diameter reduction, such that the net force to process thru the parabolic curvature die is much less than that of a straight angular taper forge-ring. Additionally, when reduced slightly in diameter, the SMP tubular elongates slightly in length, increasing the forward axial velocity, so as to naturally push the segment length between forge-rings forward into the next forge-ring orifice. In essence, the parabolic shapes work to minimize axial loads, and maximize radial wall thickening, working with the SMP pipe characteristics, instead of working against the pipe characteristics.

The mechanical aspects of the present inventive method will include large massive handling, fusion, tensioning, deformation, and installation equipment capable of managing loads up to 3 million lbs capacity for the largest of SMP Pipes (108-inch diameter, 5.15-inch thick wall). For example: 108-inch DR 21 polyethylene PE4710 bi-modal SMP pipe weighs 673 lbs per foot. The weight 5000-feet of the pipe is just over 3 million pounds. The maximum recommended push or pull stress of 1600-psi applied at 73 F on the SMP pipe cross-sectional area develops just under 3 million pounds force.

The mechanical equipment system used in the practice of the invention will be operated under the following approximate procedures:

1.0 LARGE DIAMETER SMP PIPE FUSION:

1.1 Safely unload the SMP pipe and stack no more than recommended heights, so as to maintain tubular roundness. Inspect the received pipe to assure it meets specifications.

1.2 Establish the SMP pipe fusion area, and erect a welding-fusion tent, if weather is adverse.

1.3 Using large cranes or safe handling equipment to maneuver the big diameter and long length SMP Pipe segments, and, following standard industry practice per ASTM F2620, prefuse the entire pipeline lengths together; or to preferably minimize entry-end weight and frictional drag, fuse several tubular segments into manageable 'shorter' length sections (ie: 500-ft) which can be subsequently fused together using a fusion machine with wheels or tracks, as the SMP pipe is in motion, being processed through the Deformation Tool Apparatus.

1.4 Use only Trained and CURRENTLY certified fusion machine operators. Data-Log a sufficient number of joints to verify repeatable processing. Monitor the fusion machine for continuous proper operation.

1.5 Pay close attention to the heater plate to ensure the Teflon coating is intact. Use a pyrometer to take temperature readings at the 3, 6, 9, and 12 o'clock positions on the heater plate to make sure the heater temperature is within tolerance. Repeat this in-process inspection every hour the machine is in operation. Report any defects on the heater plate immediately. No joints should be made prior to a thorough evaluation.

1.6 Perform a complete visual inspection of the pipe before loading the first joint of the session. Locate any damage to the exterior of the pipe and remove any foreign material that may have migrated to the interior of the pipe.

1.7 Set the data logger to record the jointing procedure with the first joint recorded as a sacrificial joint. The first joint of each daily start-up session is considered a sacrificial joint. This joint goes through all the fusion steps, Including Guided Reverse Bend testing IAW ASTM F3183.

1.8 Two-way radio communication is needed when loading and moving the pipe string for fusing.

1.9 Take diligent care when moving the SMP pipe to avoid mechanical damage. If there is pipe damage, onsite evaluation will be necessary. Under no circumstances should damage leaving less than 90% of the minimum specified wall thickness be left and not re-fused. Cut out any excessively damaged sections and re-fuse.

1.10 Use a suitable paint pen to mark each joint with the pipe string number, joint number, time, date, and fusion tech's name. Maintain a separate hand written log book throughout the day's fusion production.

1.11 External de-beading is required after each joint and internal de-beading is required when specified. Use commercially available bead removal tools.

1.12 Save and mark all external beads for evaluation purposes.

1.13 Measure each host pipe string from insertion bulkhead to exit bulkhead; then fuse-on an additional 20-ft to the SMP pipe string, to make it longer than the host pipe length. More length may be added if necessary, but rule-of-thumb is 20 ft (6.3 meters).

1.14 After each fusion session, download and save all information from the data logger.

1.15 Temporarily plug or cap all pipe ends, prior to the completion of the day's work.

2.0 Site Pre-Construction:

2.1 After identification of the launch and receive pits for the insertion of the SMP into the 1st Host Pipe Section, construct the system bulkhead forms and prepare for pouring. This typical bulkhead is sufficient for pull forces up to 100 tons. (Further evaluation is required when using higher tonnage for very large diameters, exerting axial forces in the range of 1500-tons.) Two concrete bulkheads are required; one for the exit-end pull rig to brace against and another for the Deformation Tool Apparatus to brace against. The minimum dimensions for each bulkhead is: 2-ft above the pipe, at least to 2-ft each side of the host pipe, 12" underneath the host pipe, and 2' thick in the axial direction. 3500 psi strength concrete is the minimum concrete strength requirement and rebar may be necessary. The bulkheads need a minimum of 0.5 pipe diameters to 1.5 pipe diameters of host-pipe length protruding through beyond the entrance and exit bulkheads when connecting to adjacent SMP pipe sections, or valves, or other pipeline components.

2.2 Determine the location of any potential hazards prior to pit excavation.

2.3 Entry Pit Length and Slope: L=2.5D+12d where: L is length of lead in trench from the Deformation Tool Apparatus die to the ground level. Some of this length can be at a slope. Add the length of the Deformation Tool Apparatus to the calculated length L. "D" is depth of cover of the host pipe. "d" is OD of PE pipe 2.4 Example: Depth 6 ft=6×2.5=15 ft OD of HDPE=40"÷12"=3.33×12=39.99 ft+15 ft=54.99 ft. This is the minimum needed for the flat bottom of the trench. A slope of 4:1 can then be used for the remainder of the trench. Therefore, the overall length of the trench will be 4×6=24 ft+54.99 ft=78.99 ft.

3.0 HOST PIPE CLEANING and GAGING: When working with various host pipe materials, different cleaning applications are needed for each host pipe. Numerous factors affect the tuberculation of the host pipe (i.e., calcium contents of the water being supplied). Determining the condition of the interior of the pipe may be impossible until the main line is decommissioned. However, experienced personnel can make a calculated evaluation of required cleaning equipment. A video camera may be fed through 16" to 30" host pipe. If the pipe size is over 30", a person may enter the pipe with correct safety measures in place. The cleaner the pipe the more room for the insertion process, therefore it is essential to obtain the cleanest pipeline possible.

3.1 Of all host pipes, some may have a higher concentration of tuberculation and require extra cleaning.

3.2 After decommissioning the host pipeline, remove sections of pipe to allow for entrance and exit access.

3.3 Immediately verify and record the ID at both ends.

3.4 After all the water or fluid has been drained from the system, evaluate the internal condition by either camera or man in the line. Install a tag line in the main during this process.

3.5 Pull a heavy-duty cable, chain, or 'links' through the host pipeline using the tag line. After review of the internal condition and evaluation of the tuberculation, select the appropriate scraper.

3.6 Connect a heavy-duty wire-rope or safety-cable to the backside of the scraper in case the scraper stops moving forward and needs to be pulled back out. After scraping, perform a second internal review to identify any potential hazards such as offset joint, protruding service feral, etc. If a hazard is identified it first must be removed or smoothed out. After scraping is complete, pull a pull-through swab plunger through the host pipeline. This may take more than one pass and must continue until all scraped debris is removed.

3.7 Pull a soft foam pig through the line. When exiting, examine the foam pig for any visible rips or tears.

3.8 After the cleaning operation is complete and the line looks clean, pass the gauging pig through the pipe at a constant, steady speed to locate any potential blockages still present. Inspect the gauging pig for existing marks before it enters the line.

3.9 After the gauging pig is pulled through without issue, plug the host pipeline at each open end. With most other non-metallic type pipes such as PCCP, AC and concrete pipe, only steps 3.6 through 3.9 are required.

4.0 Setting Entry SMP Pipe Tensioner, The Deformation Tool Apparatus, & Exit Pull Tensioner:

4.1 Set a foundation for the heavy TENSIONER, which picks up the entry portion of the SMP pipe in axial tension, and, delivers it to the Deformation Tool Apparatus in axial compression.

4.2 The pulling device at the exit end of the host pipeline exerts axial tension on the SMP pipe. The TENSIONER at the entry end, picks up the pre-fused SMP pipe, and also balances the axial compression into and the tension out of the Deformation Toll Apparatus. It is PLC managed. This device is large, heavy, and exerts high force. The Tensioner must be securely anchored to the ground by foundation and other removable anchoring devices between the TENSIONER and the ground, to deliver the required, balanced forces on the SMP pipe, at a consistent controlled speed.

4.3 Place the exit end pull rig and entry end Deformation Tool Apparatus unit on a smooth, even ground-floor in the trench excavation pits, preferably using crushed concrete bedding.

4.4 Once the rock bottom is placed to the correct height, position the trench-shoring box 'catch cages' in the receiving exit pit. Bolt the shoring box catch cages together and place flush with the exit concrete bulk head. Larger pipes are buried deeper, requiring safety trench shoring devices.

4.5 Lower the exit pit pull-rig behind the trench box catch cages and slide forward flush to the concrete bulkhead. Centralize the height of the pull-rig to the center of the host-pipe, by adding/subtracting rock to elevate (lower) the trench floor.

4.6 Insert the pulling link rods or thick wire rope through the host pipeline. Take special care to ensure no foreign debris enters the host pipeline. Once pull link rods or heavy-duty wire rope is installed through the host pipeline to the entry-end launch pit, position it about 6" short of the end of the host pipe. Do not let it exit the host pipe into the entry pit area.

4.7 After the rock bottom is placed to the correct supportive depth, position the Deformation Tool Apparatus into the launch pit, and move It forward and mount it flush with the entry pipe concrete bulkhead. Insure the Deformation Tool Apparatus is secured and centralized to the center of the host pipe.

4.8 Pull additional pull-link rods or massive wire rope through the Deformation Tool Apparatus in preparation of the SMP pipe 'string' hook up to the SMP pipe pull-head. Use care in going through the Deformation Tool Apparatus. Use wood or half-moons of plastic pipe to 'cup' and support the metallic rods or wire, so as to eliminate any potential mechanical scraping or impact damage to the Deformation Tool Apparatus. Bring the fused SMP pipe 'string' to the Deformation Tool Apparatus and connect the SMP pipe pull-head to the pull-link rods or thick wire rope with an approved connection assembly, such as a large shackle and clevis of approved load capacity.

4.9 The entry-end, fused, SMP pipe string should be supported and assisted by roller-frame assemblies along its length, at all times, before and during installation.

5.0 SMP Pipe Installation and Shape Memory Recovery.

5.1 A final check of all equipment is required before the insertion operation is started. This includes, but is not limited to, oil and fuel in the pull rig power pack, Tensioner power, two-way radios with sufficient charge, all pumps topped off with reserve fuel available, sufficient harmonic resonant fluid, etc.

5.2 Carefully inspect the Deformation Tool Apparatus to ensure it is clean and free of deficiencies, prior to SMP Pipe insertion from the Tensioner to the puller apparatus.

5.3 Carefully inspect the fused SMP pipe string for any debris that may be attached to the pipe (i.e., small stones or dried mud) prior to the deformation and insertion operation. If present, remove the debris.

5.4 After the pipe is deemed clean, apply a light coating of vegetable oil to the top of the SMP pipe string at start-up, until the pipe reaches the Harmonic Resonance portion of the Deformation Tool Apparatus.

5.5 During the insertion operation, a person with a radio must be at the insertion end at all times. A person at the pull rig pit must maintain contact with the insertion pit by radio at all times. Under no circumstances will the insertion operation begin without two-way communication at each end.

5.6 Under no circumstances are personnel allowed in the entry end insertion pit when the pipe is moving through the Deformation Tool Apparatus.

5.7 Perform the initial entry and passage pull through the Deformation Tool Apparatus at a very slow controllable speed. Maintain constant observation to ensure the SMP pipe string is centered within the host pipe. Once the SMP pipe enters the host pipe sufficiently past the pull-head, the Tensioner and pull rig can operate at their optimum deformation and insertion speed.

5.8 Continuously monitor the Tensioner and pull rig's forces during the SMP pipe insertion operation to assure proper balance so as to maximize SMP pipe radial wall thickening and to minimize its axial elongation. Maintain constant communication between both entry and exit ends during the SMP pipe string insertion.

5.9 Once the SMP pipe pull-head has entered the exit pull pit and been pulled as far forward as possible, shut-off and 'lock' the entry-end Tensioner and the exit-end pull rig so the pull-head cannot withdraw back into the host pipe. Shut off the equipment and keep it locked for at least 12 hours to facilitate strain equilibrium along the full length of the SMP pipe inside the Host Pipe.

5.10 The insertion pit it is now safe to enter. Mark the pipe 30-ft from the Deformation Tool Apparatus in one foot intervals, so as to be able to witness the length of retraction as the SMP pipe recovers towards its original diameter.

5.11 Gather all of the entry side 'rollers' and place back in their storage area.

5.12 Safely Disconnect the Deformation Tool Apparatus. A maximum of two skilled personnel are allowed in the insertion pit at any time. Maintain vigilance at all times.

5.13 Safely Release the TENSIONER load and allow the SMP pipe to naturally recover its molecular memory as macro-demonstrated by its enlarging in diameter, thinning from the thickened wall, and foreshortening from minor axial stretching. Monitor the speed and distance the entry end of the SMP moves into the host pipe until it stops in full contact with the ID of the host pipe.

5.14 Leave the SMP pipe to relax molecularly recover memory overnight for a minimum of twelve hours. After twelve hours, the SMP pipe string can be released at the pull-rig end and the pull-rig and trench catch cages removed from the pit.

5.15 Cut away the pulling head, leaving a square cut SMP pipe end.

5.16 From the host pipe exit end to the end of the SMP pipe string, mark the SMP pipe at one foot intervals to monitor and observe axial memory recovery.

5.17 Some frictional resistance is encountered as the SMP ID and host Pipe ID encroach each other. Mechanically "bump" the ends of the pipe string in the insertion and exit trench pits to push the SMP into the host pipe, and to compressively reduce axial tension and to speed the memory reversion process, which leaves the SMP pipe in radial compression with the host pipe ID.

5.18 Allow a minimum of an additional 24 hours or until the memory recover has reached its limit, before installing any connections to the new pipe.

5.19 Where the newly installed pipeline enters the host pipe, at minimum locations of the 3, 6, 9 and 12 o'clock positions, electro-fuse a standard plastic anchor-block to the OD surface of the SMP pipe, to minimize additional axial memory retraction, and to guard against thermal contraction or expansion. Cover this local assembly with flowable-fill or Cellular Lightweight Concrete (CLC) to stabilize.

5.20 Terminations of the new SMP Pipe can be made by using butt-fusion Flange adapters, butt-fusion Mechanical-Joint adapters, electrofusion couplings, and mechanical couplings. The preferred method of SMP pipe connection should be addressed with the client/owner. There are different methods using many different products and materials. A minimum of 6-feet, or 1 to 2 pipe diameters of length, which-ever is larger, is recommended to protrude from the end of the host pipe to aid in termination connections.

While the invention has been shown in several of its forms, it is not thus limited but is susceptible to various changes and modifications therein without departing from the spirit thereof.

We claim:

1. A method for in-situ fabrication of a bi-layer composite pipe by feeding a compression-fit, shape memory polymer inner pipe into a host pipe, the method comprising the steps of:

providing an inner pipe comprised of a shape memory polymer which exhibits the ability to return from a deformed shape to an original shape induced by an external stimulus;

feeding the shape memory polymer inner pipe to a pipe tensioner mechanism which pulls a tail end of the inner pipe rearward while simultaneously pushing the inner pipe forward at a constant velocity to a deformation tool mechanism and then into the host pipe, with no pull tension being used to drag the inner pipe to the deformation tool mechanism, the inner pipe being fed at constant velocity to the deformation tool mechanism;

the deformation tool mechanism being comprised of a plurality of stations of orifice forge rings of mechanically variable diameter, each of the orifice forge rings having a parabolic curvature, each forge ring having an entry and an exit, the exit of one forge ring being separated sufficiently apart from the entrance to a next successive forge ring so as to develop pipe wall axial compression in the wall of the inner pipe, resulting in recoverable radial wall thickening rather than axial elongation and wall thinning between successive forge rings;

pulling the shape memory polymer inner pipe forward with a pulling mechanism while holding the inner pipe in axial tension sufficient to inhibit diameter memory recovery of the shape memory polymer inner pipe and to overcome drag friction of the inner pipe at axial tension loads low enough to minimize axial creep elongation of the inner pipe undergoing insertion;

monitoring the pulling force of the pulling head and winch on the shape memory polymer inner pipe with a load feedback controller to thereby provide a controlled tension differential that prevents premature memory recovery of the shape memory polymer inner pipe;

discontinuing pulling of the inner pipe once the inner pipe is fully inserted within the host pipe and allowing the shape memory polymer inner pipe to recover memory and be mechanically seated and locked by compressive friction within the host pipe.

2. The method of claim 1, wherein the selective spacing of the orifice forging rings within the deformation tool mechanism enables partial shape memory polymer outer diameter recovery when passing through successive forging rings, so that the partially recovered shape memory polymer inner pipe enters each successive orifice forging ring at a slightly larger diameter than the diameter it possessed when exiting the prior orifice forging ring.

3. The method of claim 2, wherein the shape memory polymer inner pipe is subjected to external stimuli while in the deformation tool mechanism, said stimuli being selected from the group consisting of temperature control, ultrasonics and the use of lubricants.

4. The method of claim 3, wherein one or more infrared radiation devices are incorporated into the manufacturing process to alter the shape memory polymer inner pipe's physical properties raising the temperature of the polymer to a desired temperature to increase the malleability of the polymer using an infrared radiation energy at a selected infrared wave-frequency band, which is absorbed by a specific shape memory polymer.

5. The method of claim 4, wherein the shape memory polymer chosen for the inner pipe which is used in the process has a characteristic ability to absorb infrared energy up to a maximum watts per square inch density flux and wherein the produced watt density flux of the specifically absorbed infrared radiation frequency bands is kept at or below the shape memory polymer's maximum absorbable watt density flux limit.

6. The method of claim 1, wherein the shape memory polymer inner pipe being acted upon by the deformation tool mechanism is also subjected to harmonic vibrational enhancement by subjecting the polymer to high speed vibration.

7. The method of claim 1, wherein the harmonic vibrational enhancement is accomplished by applying a fluid in direct contact with an external surface of the shape memory polymer inner pipe as it passes through the one or more of the orifice forging rings.

8. The method of claim 1, wherein the shape memory polymer inner pipe is pulled into the host pipe by a pull head assembly which applies a tension load to the inner pipe which is sufficient to oppose the inherent recovery of the shape memory polymer inner pipe towards its original diameter, the tension load acting to neck-down the length of the inner pipe while the inner pipe is attempting to recover its original outer diameter, the force of the axially pull tension being sufficient to off-set, balance or slow down the outer diameter recovery process.

9. The method of claim 1, wherein the shape memory polymer which is used for the inner pipe is selected from the group consisting of amorphous and semi-crystalline macromolecular structural polymeric materials having the characteristic ability to return from a deformed state to an original shape induced by an external stimulus such as a temperature change or a release of deformation stress.

10. The method of claim 9, wherein the shape memory polymer is selected from the group consisting of polyethylene, nylon, polycarbonate, PBT, and polyvinylchloride (PVC).

11. The method of claim 10, wherein the shape memory polymer is a pipe-grade polyethylene, as defined by ASTM D2837 and ISO 9080.

12. The method of claim 11, wherein the shape memory polymer is a pipe grade polyethylene selected from the group consisting of PE4710 (ASTM D3350) and PE100 (ISO).

13. The method of claim 12, wherein the shape memory polymer is selected from the group consisting of bi-modal, tri-modal, and/or multi-nodal molecular weight distribution PE4710's and PE100's.

\* \* \* \* \*